(12) United States Patent
Slepchenkov et al.

(10) Patent No.: US 10,821,843 B2
(45) Date of Patent: Nov. 3, 2020

(54) SYSTEMS AND METHODS FOR POWER MANAGEMENT AND CONTROL

(71) Applicant: TAE TECHNOLOGIES, INC., Foothill Ranch, CA (US)

(72) Inventors: Mikhail Slepchenkov, Irvine, CA (US); Roozbeh Naderi, Irvine, CA (US)

(73) Assignee: TAE TECHNOLOGIES, INC., Foothill Ranch, CA (US)

( * ) Notice: Subject to any disclaimer, the term of this patent is extended or adjusted under 35 U.S.C. 154(b) by 0 days.

(21) Appl. No.: 16/681,429

(22) Filed: Nov. 12, 2019

(65) Prior Publication Data
US 2020/0207219 A1 Jul. 2, 2020

Related U.S. Application Data

(63) Continuation of application No. PCT/US2019/023695, filed on Mar. 22, 2019.
(Continued)

(51) Int. Cl.
*B60L 50/61* (2019.01)
*B60L 58/12* (2019.01)
(Continued)

(52) U.S. Cl.
CPC .............. *B60L 50/61* (2019.02); *B60L 7/16* (2013.01); *B60L 50/40* (2019.02); *B60L 58/12* (2019.02);
(Continued)

(58) Field of Classification Search
CPC .................................. B06L 58/12; B06L 53/00
See application file for complete search history.

(56) References Cited

U.S. PATENT DOCUMENTS

| 5,204,548 | A | 4/1993 | Daehler et al. |
| 5,428,522 | A | 6/1995 | Millner et al. |

(Continued)

FOREIGN PATENT DOCUMENTS

| CA | 2 810 369 A1 | 3/2012 |
| CN | 201789411 U | 4/2011 |

(Continued)

OTHER PUBLICATIONS

Maharjan, L., et al., "State-of-Charge (SOC)-Balancing Control of a Battery Energy Storage System Based on a Cascade PWM Converter", IEEE Transactions on Power Electronics, 2009, vol. 24, No. 6, pp. 1628-1636.

(Continued)

*Primary Examiner* — Robert Grant
(74) *Attorney, Agent, or Firm* — One LLP

(57) ABSTRACT

Systems and methods directed to improved battery management, motor control, energy storage and battery charging. The systems and methods enable vehicle electrification and provides a paradigm changing platform that enables integration of battery management, charging and motor controls with means to manage regenerative braking, traction and handling. In embodiments, systems and methods are directed to a unified modular battery pack system having a cascaded architecture comprising an integrated combination of a networked low voltage converter/controller with peer-to-peer communication capability, embedded ultra-capacitor or other secondary energy storage element, battery management system and serially connected set of individual cells as the fundamental building block.

44 Claims, 29 Drawing Sheets

Related U.S. Application Data

(60) Provisional application No. 62/646,861, filed on Mar. 22, 2018.

(51) Int. Cl.
  *B60L 50/40* (2019.01)
  *H02J 7/00* (2006.01)
  *B60L 7/16* (2006.01)
  *H02J 7/14* (2006.01)

(52) U.S. Cl.
  CPC .......... *H02J 7/0048* (2020.01); *H02J 7/1438* (2013.01); *B60L 2210/20* (2013.01); *H02J 2207/50* (2020.01); *H02J 2310/48* (2020.01)

(56) References Cited

U.S. PATENT DOCUMENTS

| | | | |
|---|---|---|---|
| 5,905,371 A | 5/1999 | Limpaecher | |
| 5,949,664 A | 9/1999 | Bernet et al. | |
| 6,051,961 A | 4/2000 | Jang et al. | |
| 6,064,180 A | 5/2000 | Sullivan et al. | |
| 6,373,734 B1 | 4/2002 | Martinelli | |
| 7,091,701 B2 | 8/2006 | Turner et al. | |
| 7,485,987 B2 | 2/2009 | Mori et al. | |
| 8,395,280 B2 | 3/2013 | Graovac et al. | |
| 8,476,888 B1 | 7/2013 | Chen et al. | |
| 8,503,202 B2 | 8/2013 | Chimento et al. | |
| 8,614,525 B2 | 12/2013 | Teichmann et al. | |
| 8,829,723 B2 | 9/2014 | Graovac et al. | |
| 9,172,254 B2 | 10/2015 | Ganor | |
| 9,444,275 B2 | 9/2016 | Huang et al. | |
| 9,461,474 B2 | 10/2016 | Deboy et al. | |
| 9,673,732 B2 * | 6/2017 | Deboy | H02M 7/49 |
| 10,074,995 B2 | 9/2018 | Smedley et al. | |
| 10,193,359 B2 | 1/2019 | Ganor | |
| 2004/0008016 A1 | 1/2004 | Sutardja et al. | |
| 2004/0037101 A1 | 2/2004 | Meynard et al. | |
| 2006/0097782 A1 | 5/2006 | Ebner | |
| 2006/0202636 A1 | 9/2006 | Schneider | |
| 2008/0245593 A1 | 10/2008 | Kim | |
| 2009/0251212 A1 | 10/2009 | Pillonnet et al. | |
| 2009/0311891 A1 | 12/2009 | Lawrence et al. | |
| 2010/0085789 A1 | 4/2010 | Ulrich et al. | |
| 2010/0121511 A1 | 5/2010 | Onnerud et al. | |
| 2010/0298957 A1 | 11/2010 | Sanchez Rocha et al. | |
| 2010/0301827 A1 | 12/2010 | Chen et al. | |
| 2011/0140533 A1 | 6/2011 | Zeng et al. | |
| 2011/0148198 A1 | 6/2011 | Tripathi et al. | |
| 2011/0198936 A1 | 8/2011 | Graovac et al. | |
| 2012/0074949 A1 | 3/2012 | Kepley et al. | |
| 2012/0155140 A1 | 6/2012 | Chen et al. | |
| 2012/0161858 A1 | 6/2012 | Permuy et al. | |
| 2012/0195084 A1 | 8/2012 | Norrga | |
| 2012/0262967 A1 | 10/2012 | Cuk | |
| 2013/0027126 A1 | 1/2013 | Jayaraman et al. | |
| 2013/0083563 A1 | 4/2013 | Wang et al. | |
| 2013/0088254 A1 | 4/2013 | Hoang et al. | |
| 2013/0088903 A1 | 4/2013 | Sagona et al. | |
| 2013/0154521 A1 | 6/2013 | Butzmann et al. | |
| 2013/0302652 A1 | 11/2013 | Wolff et al. | |
| 2014/0042827 A1 | 2/2014 | Wolff | |
| 2014/0104899 A1 | 4/2014 | Fischer et al. | |
| 2014/0239927 A1 | 8/2014 | Nascimento et al. | |
| 2014/0254219 A1 | 9/2014 | Davies | |
| 2014/0354212 A1 | 12/2014 | Sugeno et al. | |
| 2015/0049532 A1 | 2/2015 | Bernet et al. | |
| 2015/0229227 A1 | 8/2015 | Aeloiza et al. | |
| 2015/0249351 A1 | 9/2015 | Wolff et al. | |
| 2015/0280604 A1 | 10/2015 | Hassanpoor | |
| 2015/0288287 A1 | 10/2015 | Madawala et al. | |
| 2015/0296292 A1 | 10/2015 | Hogan et al. | |
| 2015/0303820 A1 | 10/2015 | Cubaines | |
| 2015/0340964 A1 | 11/2015 | Modeer | |
| 2015/0364935 A1 | 12/2015 | Fetzer et al. | |
| 2016/0183451 A1 | 6/2016 | Conrad et al. | |
| 2016/0240894 A1 | 8/2016 | Wartenberg et al. | |
| 2017/0054306 A1 | 2/2017 | Vo et al. | |
| 2017/0366079 A1 | 12/2017 | Bhowmik et al. | |
| 2019/0312504 A1 | 10/2019 | Kim et al. | |

FOREIGN PATENT DOCUMENTS

| | | |
|---|---|---|
| CN | 204156591 U | 2/2015 |
| EP | 0 907 238 A1 | 4/1999 |
| EP | 2 290 799 A1 | 3/2011 |
| WO | WO 2011/009689 A2 | 1/2011 |
| WO | WO 2011/082855 A2 | 7/2011 |
| WO | WO 2011/082856 A2 | 7/2011 |
| WO | WO 2011/128133 A1 | 10/2011 |
| WO | WO 2012/016735 A1 | 2/2012 |
| WO | WO 2012/038162 A1 | 3/2012 |
| WO | WO 2013/056900 A2 | 4/2013 |
| WO | WO 2014/151178 A2 | 9/2014 |
| WO | WO 2014/193254 A1 | 12/2014 |
| WO | WO 2018/072837 A1 | 4/2018 |
| WO | WO 2019/180699 A1 | 9/2019 |

OTHER PUBLICATIONS

Maharjan, L., et al., "Fault-Tolerant Operation of a Battery-Energy-Storage System Based on a Multilevel Cascade PWM Converter With Star Configuration", IEEE Transactions on Power Electronics, 2010, vol. 25, No. 9, pp. 2386-2396.

WO, PCT/US18/37081 ISR and Written Opinion, dated Oct. 17, 2018.

WO, PCT/US18/38089 ISR and Written Opinion, dated Oct. 29, 2018.

WO, PCT/US19/23695 ISR and Written Opinion, dated Aug. 12, 2019.

* cited by examiner

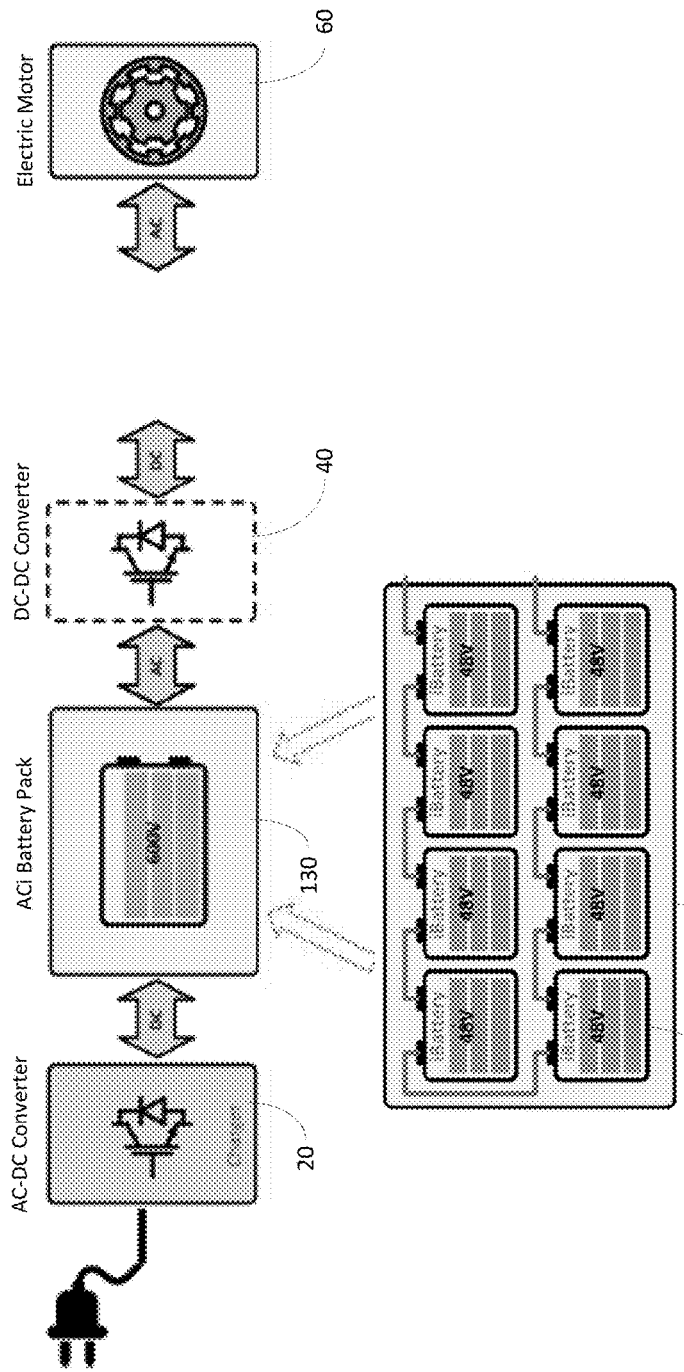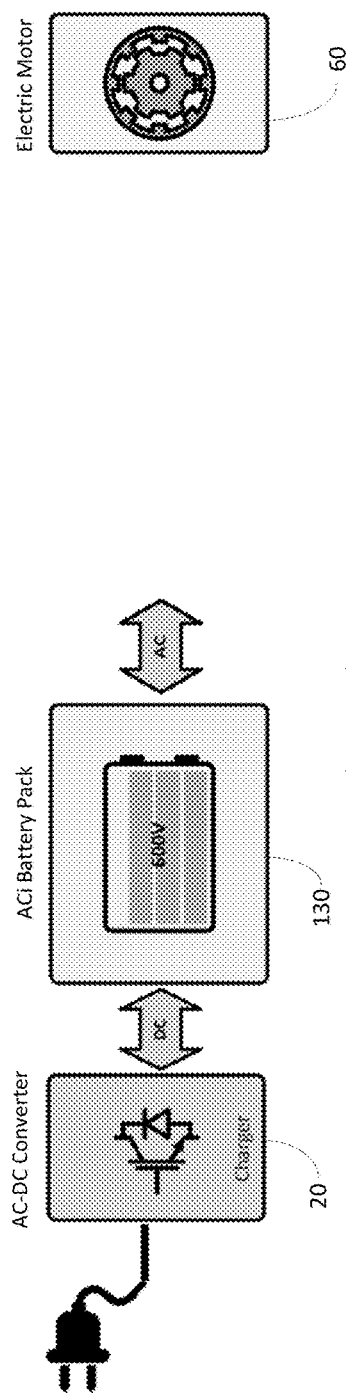

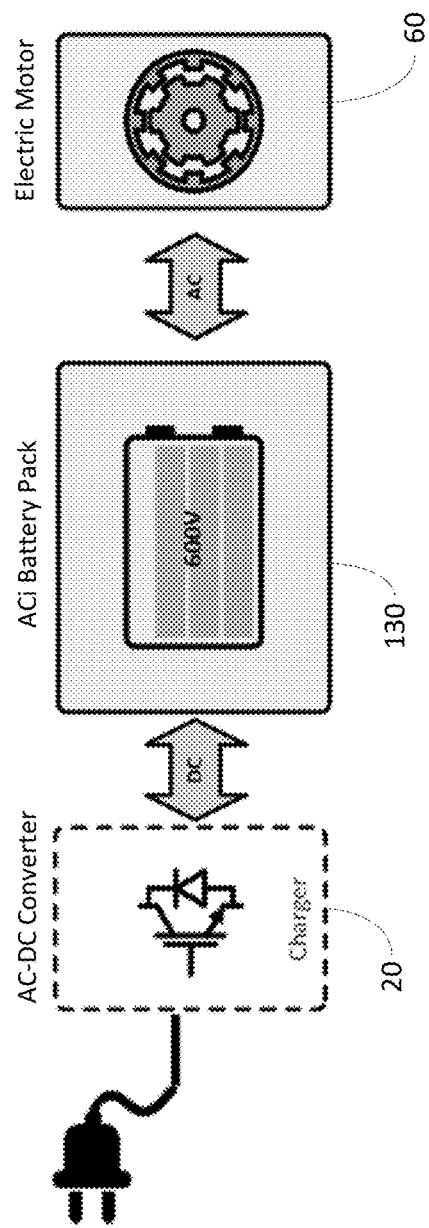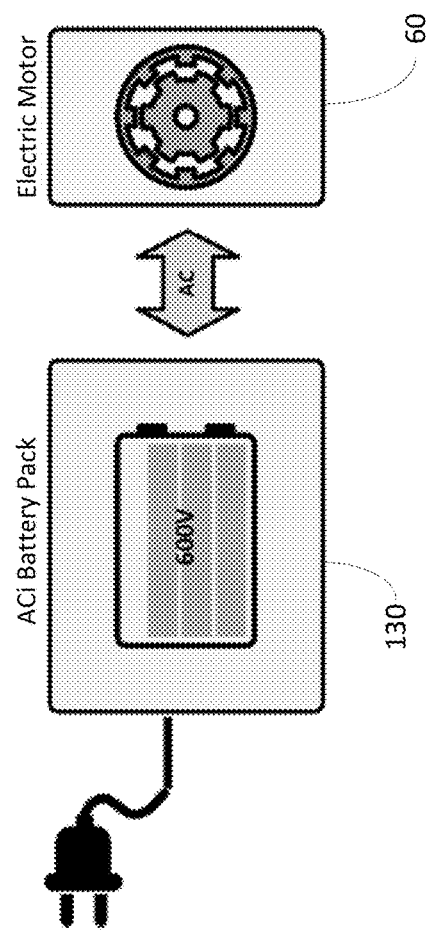
FIGURE 3H
FIGURE 3I

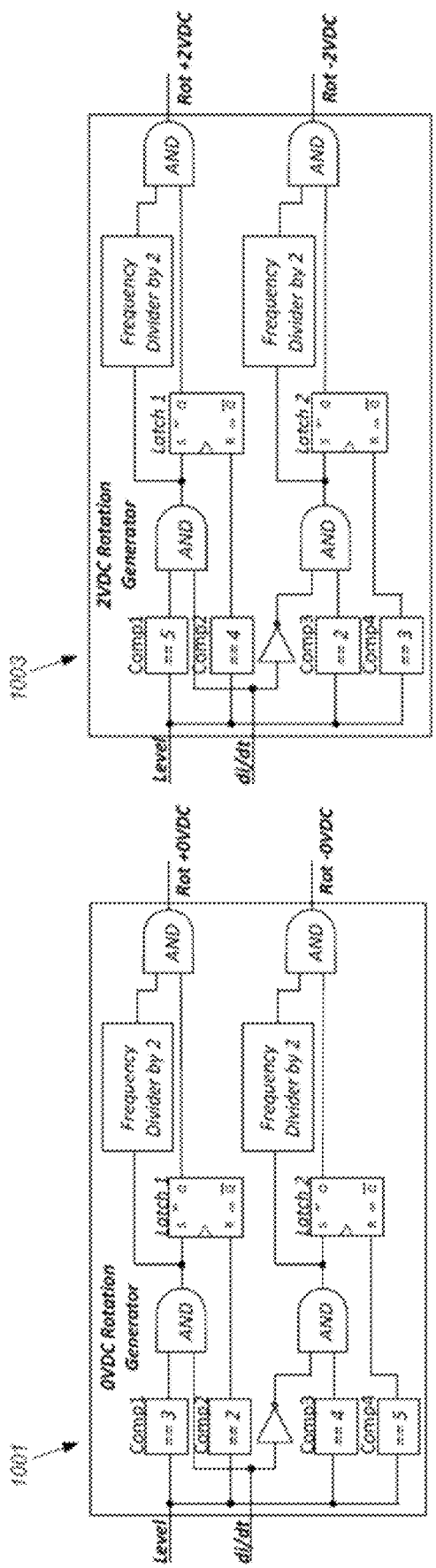
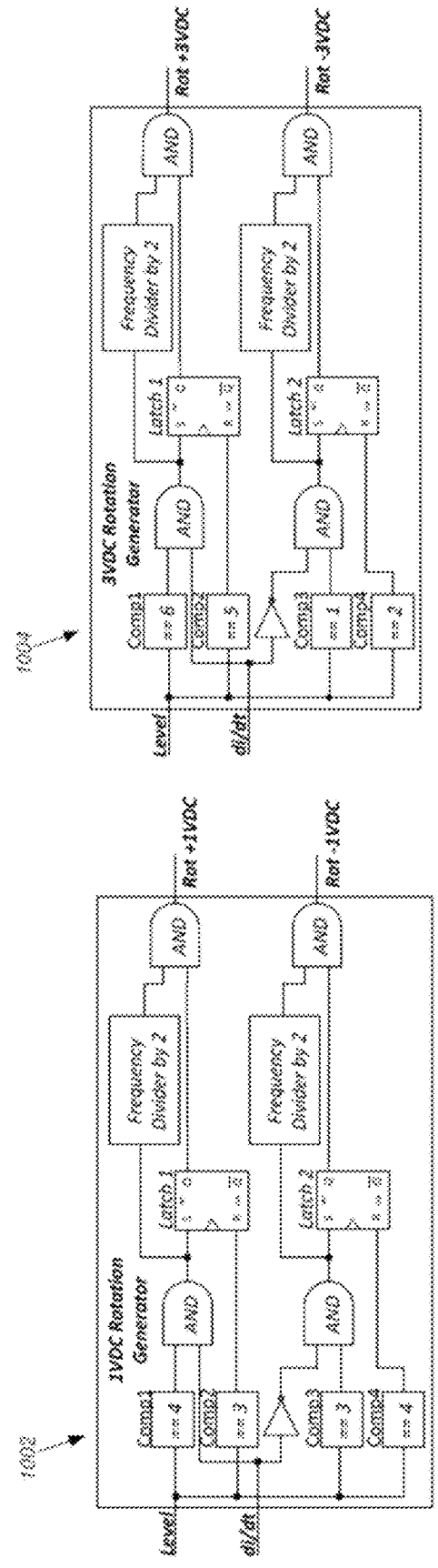
FIGURE 16C
FIGURE 16D
FIGURE 16A
FIGURE 16B

SYSTEMS AND METHODS FOR POWER MANAGEMENT AND CONTROL

CROSS-REFERENCE TO RELATED APPLICATIONS

The subject application is a continuation of PCT Patent Application No. PCT/US19/23695, filed Mar. 22, 2019, which claims priority to U.S. Provisional Patent Application No. 62/646,861, filed on Mar. 22, 2018, both of which are incorporated by reference herein in their entireties for all purposes.

FIELD

The present disclosure relates to electric power management and control of battery systems, and more particularly to systems and methods that facilitate improved battery management, motor control, energy storage, and battery charging for electric vehicles and other stationary applications.

BACKGROUND

Today's automobile technology, as evolved over the past century, is characterized, amongst many things, by an interplay of motors, mechanical elements, and electronics. These are the key components that impact vehicle performance and driver experience. Motors are of the combustion or electric type and one usually finds one motor per car, exceptions being cars with hybrid drivetrains, featuring a combination of a combustion engine with one or two electric motors, or performance oriented electric vehicles that are outfitted with two motors. In almost all cases the rotational energy from the motor(s) is delivered via a set of highly sophisticated mechanical elements, such as clutches, transmissions, differentials, drive shafts, torque tubes, couplers, etc. These parts control to a large degree torque conversion and power distribution to the wheels and are key elements to define the performance of the car. They also impact road handling. Over the years individual car manufacturers have highly optimized these mechanical parts to provide better performance, higher fuel efficiency and ultimately differentiation in the market place. On the control side, apart from driver comforts such as entertainment, navigation and human machine interface elements, there are typically only a few clusters of specialty electronics hardware and embedded software that control/optimize motors, clutch/transmission operation and road holding/handling.

Today's electric automobiles or vehicles (EVs) have largely adopted most of the hundred-year old design paradigm of a combustion vehicle, with the obvious substitutions of batteries, charging systems and electric motors for the usual gas tank, fuel pumps/injectors and combustion engine. While the control electronics are adapted to the difference in components, it is important to realize that most of the mechanical drivetrain parts described above are still there (see, e.g., FIGS. 1 and 2). This is to say that the overall design philosophy of current EVs has moved little beyond the conventional paradigm. As such, the true potential of electrification is not being realized.

An EV comprises various electrical systems that are related to the drivetrain including, among others, the battery, the charger and motor control. A short inventory of the current capabilities and shortcomings of these electrical systems include:

Conventional Battery Design

At the moment, high voltage battery packs are typically organized in a serial chain of lower voltage battery modules. Each such module is further comprised of a serially connected set of individual cells and a simple embedded battery management system to regulate basic cell related characteristics, such as state of charge and voltage. Electronics with more sophisticated capabilities or some form of smart interconnectedness is absent. As a consequence, any monitoring or control function is handled by a separate system, which, if at all present elsewhere in the car, lacks the ability to monitor individual cell health, state of charge, temperature and other performance impacting metrics. There is also no ability to adjust power draw per individual cell in any form. Some of the major consequences are: (1) the weakest cell constrains the overall performance of the entire battery pack, (2) failure of any cell or module leads to a need for replacement of the entire pack, (3) battery reliability and safety are considerably reduced, (4) battery life is limited, (5) thermal management is difficult, (6) battery packs always operate below maximum capabilities, (7) sudden inrush into the battery packs of regenerative braking derived electric power cannot be readily stored in the batteries and will require dissipation via a dump resistor.

Current Charger Design

Charging circuits are typically realized in separate on-board systems. They stage power coming from outside the EV in the form of an AC signal or a DC signal, convert it to DC and feed it to the battery pack(s). Charging systems monitor voltage and current and typically supply a steady constant feed. Given the design of the battery packs and typical charging circuits, there is little ability to tailor charging flows to individual battery modules based on cell health, performance characteristics, temperature, etc. Charging cycles are also typically long as the charging systems and battery packs lack the circuitry to allow for pulsed charging or other techniques that would optimize the charge transfer or total charge achievable.

Current Motor Control Design

Conventional controls contain DC to DC conversion stages to adjust battery pack voltage levels to the bus voltage of the EV's electrical system. Motors, in turn, are then driven by simple two-level multiphase converters that provide the required AC signal(s) to the electric motor. Each motor is traditionally controlled by a separate controller, which drives the motor in a 3-phase design. Dual motor EVs would require two controllers, while EVs using four in-wheel motors would require 4 individual controllers. The conventional controller design also lacks the ability to drive next generation motors, such as switch reluctance motors (SRM), characterized by higher number of pole pieces. Adaptation would require higher phase designs, making the systems more complex and ultimately fail to address electric noise and driving performance, such as high torque ripple and acoustical noise.

In view of the foregoing limitations, systems and methods that facilitate improved battery management, motor control, power storage, and battery charging are desirable to address the above noted shortcomings and provide a paradigm changing platform.

SUMMARY

The embodiments of the present disclosure are directed to systems and methods that facilitate improved battery management, motor control, energy storage and battery charging. As such, the systems and methods provided herein enable realization of the true potential of vehicle electrification and provide a paradigm changing platform that intelligently integrates battery management, charging and motor controls with means to manage regenerative braking, traction and handling.

Exemplary embodiments of the present disclosure are preferably directed to a unified modular battery pack system having a cascaded architecture comprising an integrated combination of a networked low voltage converter/controller with peer-to-peer communication capability, embedded ultra-capacitor or other secondary energy storage element, battery management system and serially connected set of individual cells as the fundamental building block. An interconnected assembly of such intelligent battery modules becomes effectively a smart electrical "neural network" and the replacement for: (1) a charging system, (2) battery management modules, (3) DC to DC converter, and (4) motor controller(s).

This modular smart battery pack system is not only combinable with conventional EV motors and drive trains, it is combinable with new in-wheel EV motors being developed for use in future EVs.

In exemplary embodiments provided herein, the electronics of each modular smart battery pack are based on a multilevel controller, which in certain exemplary embodiments is preferably a bi-directional multilevel hysteresis controller, combined with temperature sensors and networking interface logic. This design provides a long list of advantages: (1) improved battery utilization through individual switching of modules based on their age, thermal condition and performance characteristics; (2) reduced thermal losses in cells through careful power consumption or power generation balancing; (3) slowed cell aging through better individual thermal management and filtering of high-order current harmonics; (4) capability of granular monitoring of battery health and early warning of servicing need; (5) fail-safe and redundant design capable of maintaining drivability, even under individual module failure; (6) higher efficiency and better economics through utilization of new semiconductor technologies operating at lower component voltages to reduce power losses and cost; (7) software based optimization of topologies and control methods to adapt to different vehicle characteristics; (8) close to full recuperation of energy from regenerative braking and fast response on acceleration by virtue of embedded ultra-capacitors; (9) integrated on-board optimized charging due to individual cell load balancing and monitoring, including ultra-fast pulsed charging driven by intelligent controller circuitry; (10) reduced electromagnet interference and sensitivity of the circuit topology; (11) adaptive neural-net based coordination between modules to enhance overall system performance, response time, thermal management and collective system efficiency; (12) elimination of mechanical drivetrain components and associated losses when combined with in-wheel motors; (13) reduction of overall drivetrain magnetic and electric losses; (14) increased power density when used with in-wheel motors; (15) reduction of torque ripple and increased passenger comfort due to reduced electrical and mechanical noise from refined motor control and electrical filtering; (16) ability to adapt to and be optimized for all current and next generation motor designs; (17) reduction in space providing more room for passengers/cargo/additional batteries (more range); (18) reduction in weight providing for better performance, higher vehicle efficiency, farther driving range; (19) superior handling and better traction when combined with in-wheel motors; (20) universal building block, adaptable for use from small passenger cars to large buses and commercial trucks; (21) software based differentiation of vehicle characteristic instead of via traditional mechanical component designs.

Other systems, methods, features and advantages of the example embodiments will be or will become apparent to one with skill in the art upon examination of the following figures and detailed description.

BRIEF DESCRIPTION OF THE DRAWINGS

The details of the example embodiments, including structure and operation, may be gleaned in part by study of the accompanying figures, in which like reference numerals refer to like parts. The components in the figures are not necessarily to scale, emphasis instead being placed upon illustrating the principles of the disclosure. Moreover, all illustrations are intended to convey concepts, where relative sizes, shapes and other detailed attributes may be illustrated schematically rather than literally or precisely.

FIGS. 3A through 3I illustrate schematics showing the power electronic circuit according to embodiments of the present disclosure as an intelligent, modular representation of the conventional high voltage power electronic circuit for a battery electric vehicle shown in FIG. 1; FIG. 3A shows the high voltage battery pack comprising a serial chain of low voltage battery modules; FIG. 3B shows each battery module comprising a series connection of lower voltage battery cells and an integrated battery management or control system; FIG. 3C shows the high voltage DC/AC converter split into multiple low voltage DC/AC converters in series; FIG. 3D shows an individual low voltage DC/AC converter integrated within an individual battery module; FIG. 3E shows an ultra- or super-capacitor integrated within an individual battery module to intermittently store in-rush of braking power; FIG. 3F shows an high voltage intelligent modular AC battery pack comprising a series connection of lower voltage intelligent battery modules integrated with battery management or control systems, low voltage converters and ultra-capacitors; FIGS. 3G and 3H shows the DC/DC converter removed from the power electronic circuit; and FIG. 3I shows the AC/DC converter/charger removed from the power electronic circuit.

FIG. 10A illustrates the current control error $I_{ERROR}$, as a difference between $I_{REAL}$ and $I_{REF}$; FIG. 10 B illustrates the reference current $I_{REF}$ and real current $I_{REAL}$ in motor phase.

FIGS. 16A, 16B, 16C and 16D illustrate functional diagrams of 0 VDC Rotation Generator (FIG. 16A), 1 VDC Rotation Generator (FIG. 16B), 2 VDC Rotation Generator (FIG. 16C) and 3 VDC Rotation Generator (FIG. 16D).

It should be noted that elements of similar structures or functions are generally represented by like reference numerals for illustrative purpose throughout the figures. It should also be noted that the figures are only intended to facilitate the description of the preferred embodiments.

DETAILED DESCRIPTION

The following embodiments are described in detail to enable those skilled in the art to make and use various embodiments of the present disclosure. It is understood that other embodiments would be evident based on the present disclosure, and that system, process, or changes may be made without departing from the scope of the present embodiments.

The embodiments of the present disclosure are directed to systems and methods that facilitate improved battery management, motor control, energy storage and battery charging. As such, the systems and methods provided herein enable realization of the true potential of vehicle electrification and provide a paradigm changing platform that intelligently integrates battery management, charging and motor controls with means to manage regenerative braking, traction and handling.

Exemplary embodiments of the present disclosure are preferably directed to a unified modular battery pack system having a cascaded architecture comprising an integrated combination of a networked low voltage converter/controller with peer-to-peer communication capability, embedded ultra-capacitor, battery management system and serially connected set of individual cells as the fundamental building block. An interconnected assembly of such intelligent battery modules becomes effectively a smart electrical "neural network" and the replacement for: (1) a charging system, (2) battery management modules, (3) DC to DC converter, and (4) motor controller(s).

This modular smart battery pack system is not only combinable with conventional EV motors and drive trains, it is combinable with new in-wheel EV motors being developed for use in future EVs.

In exemplary embodiments provided herein, the electronics are based on a bi-directional multilevel controller, combined with temperature sensors and networking interface logic. In certain exemplary embodiments the bi-directional controller is a bi-directional multilevel hysteresis controller.

Figure 1:
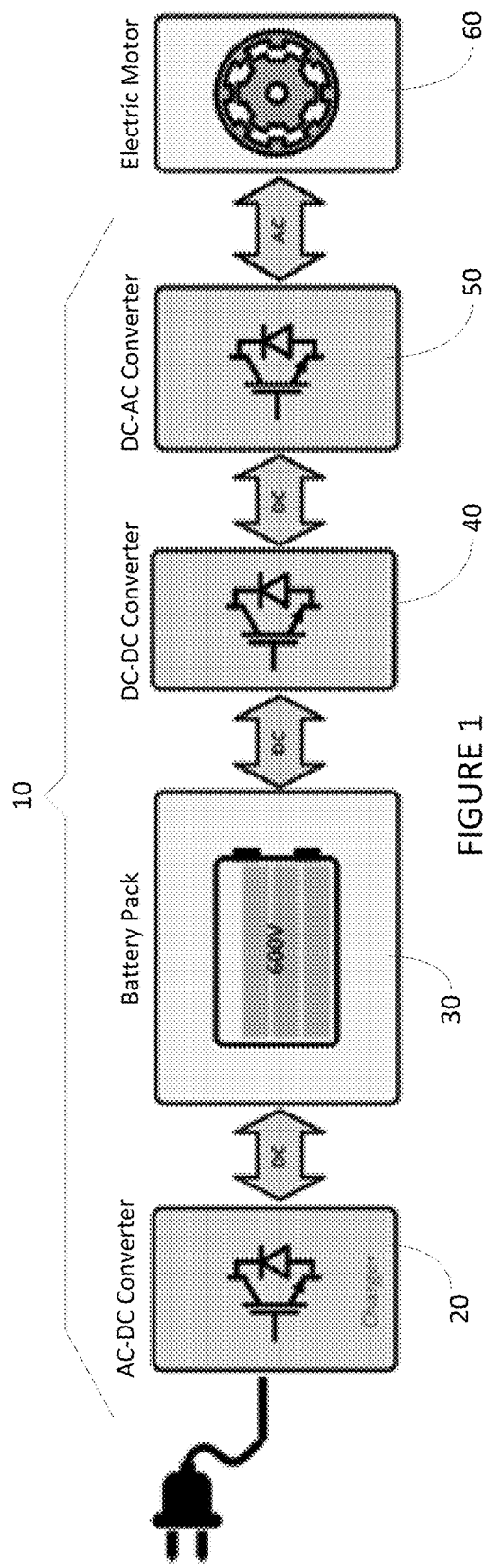
FIG. 1 illustrates a simplified schematic of the power electronic circuit and electric motor of a conventional battery electric vehicle.

Turning in detail to the figures, a simplified schematic of a conventional power electronic circuit 10 and electric motor 70 is shown in FIG. 1. As shown in FIG. 1, the power electronic circuit 10 typically includes a charger 20 comprising an AC-DC converter, a high voltage battery pack 30 electrically coupled to the charger 20, a DC-DC converter 40 electrically coupled to the high voltage battery pack 30, an DC-AC converter 50 electrically coupled to the DC-DC converter 40, and an electric motor 60 electrically coupled to the DC-AC converter 50.

Figure 3A:
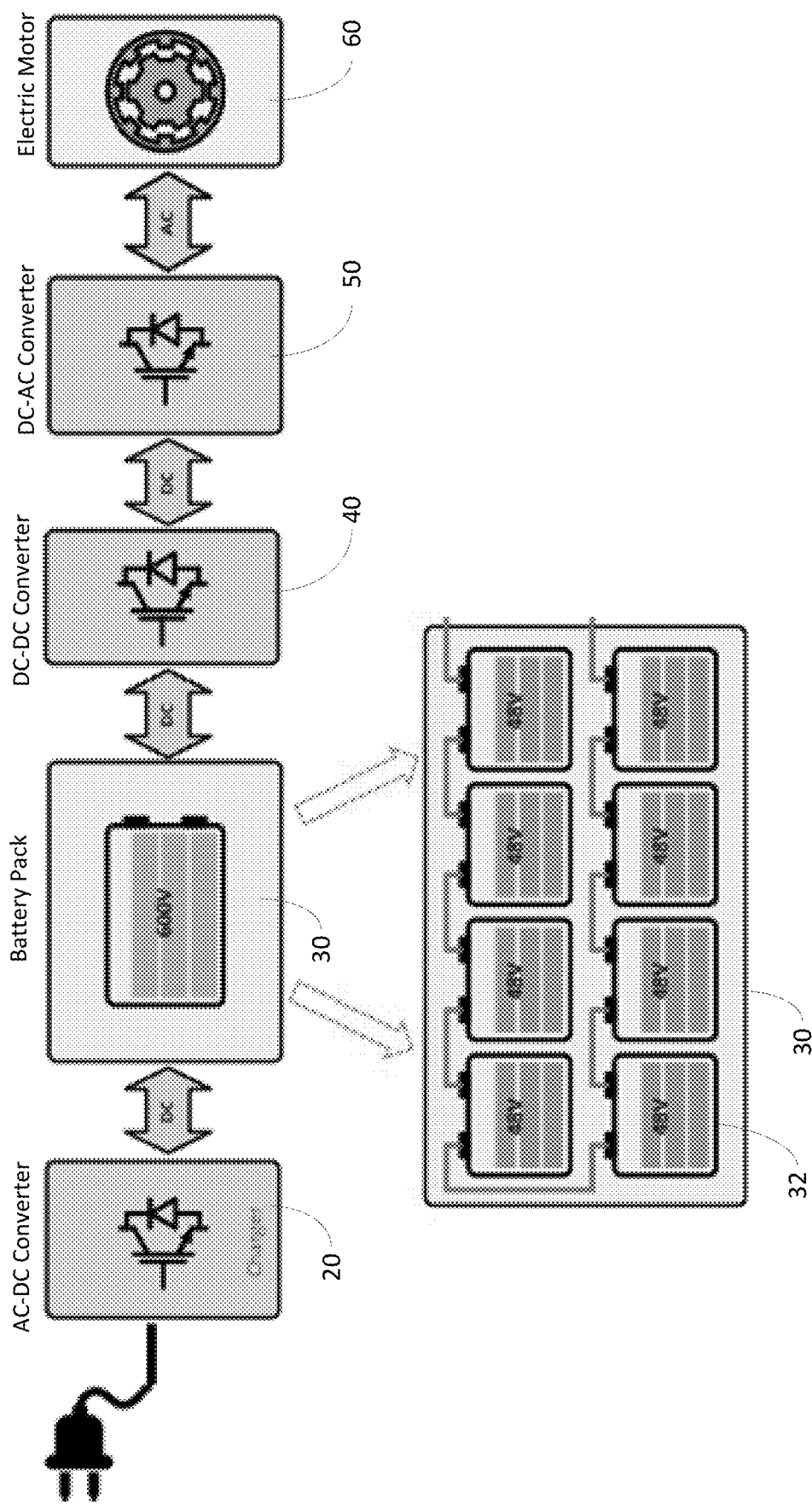
Figure 3B:
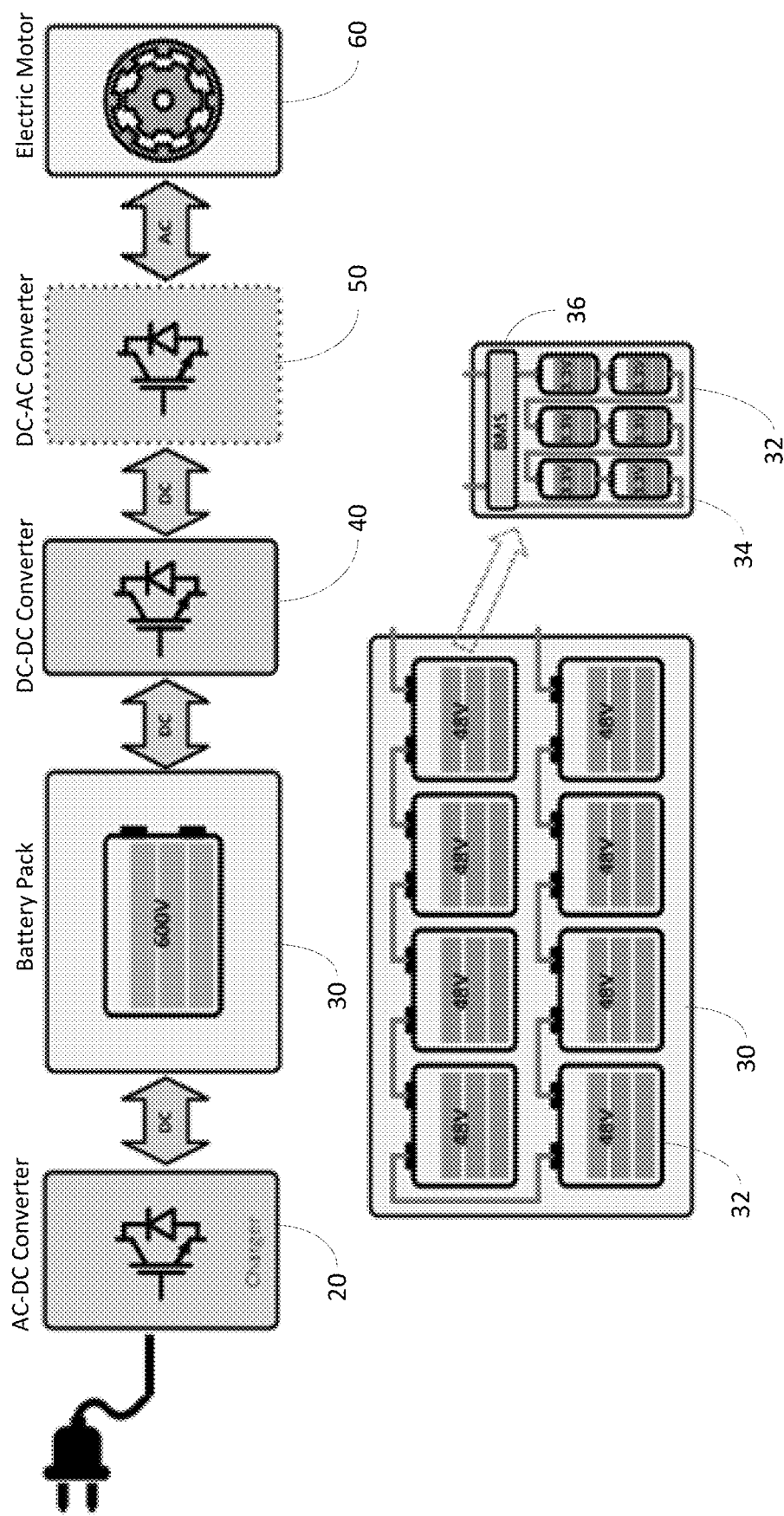

Conventional high voltage battery packs 30 are typically organized in a serial chain of low voltage battery modules 32 (see, e.g., FIGS. 3A and 3B). Each such module 32 is further comprised of a serially connected set of individual lower voltage cells 34 and a simple embedded battery management system 36 to regulate basic cell related characteristics, such as state of charge and voltage (see, e.g., FIG. 3B). Electronics with more sophisticated capabilities or some form of smart interconnectedness is absent. As a consequence, there is also no ability to adjust power draw per individual cell 34 in any form. Some of the major consequences are: (1) the weakest cell constrains the overall performance of the entire battery pack, (2) failure of any cell/module leads to a need for replacement of the entire pack, (3) battery reliability and safety are considerably reduced, (4) battery life is limited, (5) thermal management is difficult, (6) packs always operate below maximum capabilities, (7) sudden inrush of regenerative braking derived electric power cannot be readily stored in the batteries.

Conventional charging circuits or systems, such as those represented by the charger 20, are usually realized in separate on-board systems. Such charging systems stage power (AC or DC signal) coming from outside the EV and convert it to DC and feed it to the battery pack(s) 30. The charging systems monitor voltage and current and typically supply a steady constant feed. Given the design of the batteries and typical charging circuits, there is little ability to tailor charging flows to individual battery modules 32 of the battery pack 30 based on cell health, performance characteristics, temperature, etc. Charging cycles are also typically long as the charging systems and battery packs 30 and individual modules 32 lack the circuitry to allow for pulsed charging or other techniques that would optimize the charge transfer or total charge achievable.

Conventional controls contain DC to DC conversion stages (see, e.g., DC-DC converter 40) to adjust the voltage levels of the battery pack 30 to the bus voltage of the electrical system of the EV. Motors, such as motor 60, in turn, are then driven by simple two-level multiphase converters (see, e.g., DC-AC converter 50) that provide the required AC signal(s) to the electric motor 60. Each motor is traditionally controlled by a separate controller, which drives the motor in a 3-phase design. Dual motor EVs would require two controllers, while EVs using four in-wheel motors would require 4 individual controllers. The conventional controller design also lacks the ability to drive next generation motors, such as, e.g., switch reluctance motors (SRM), which are characterized by a higher number of pole pieces. Adaptation would require higher phase designs, making the systems more complex and ultimately fail to address electric noise and driving performance, such as high torque ripple and acoustical noise.

Figure 2:
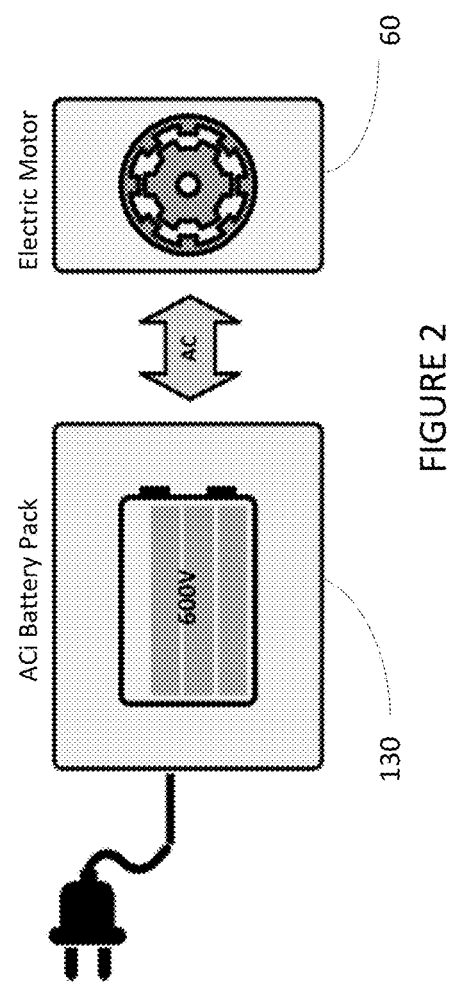
FIG. 2 illustrates a schematic of a power electronic circuit and electric motor for a battery electric vehicle according to embodiments of the present disclosure having a unified modular system with cascaded architecture including an intelligent modular AC battery pack comprising a series connection of intelligent low voltage battery modules.

In contrast to the complex power electronic circuit 10 of conventional EVs, exemplary embodiments provided herein as illustrated in FIG. 2, replace the charging system 20, battery management modules, DC to DC converter 40, and motor controller(s) 50 with an intelligent or smart modular AC battery pack 130 comprising an interconnected assembly of intelligent or smart battery modules 132 effectively providing a smart electrical "neural network".

Figure 3C:
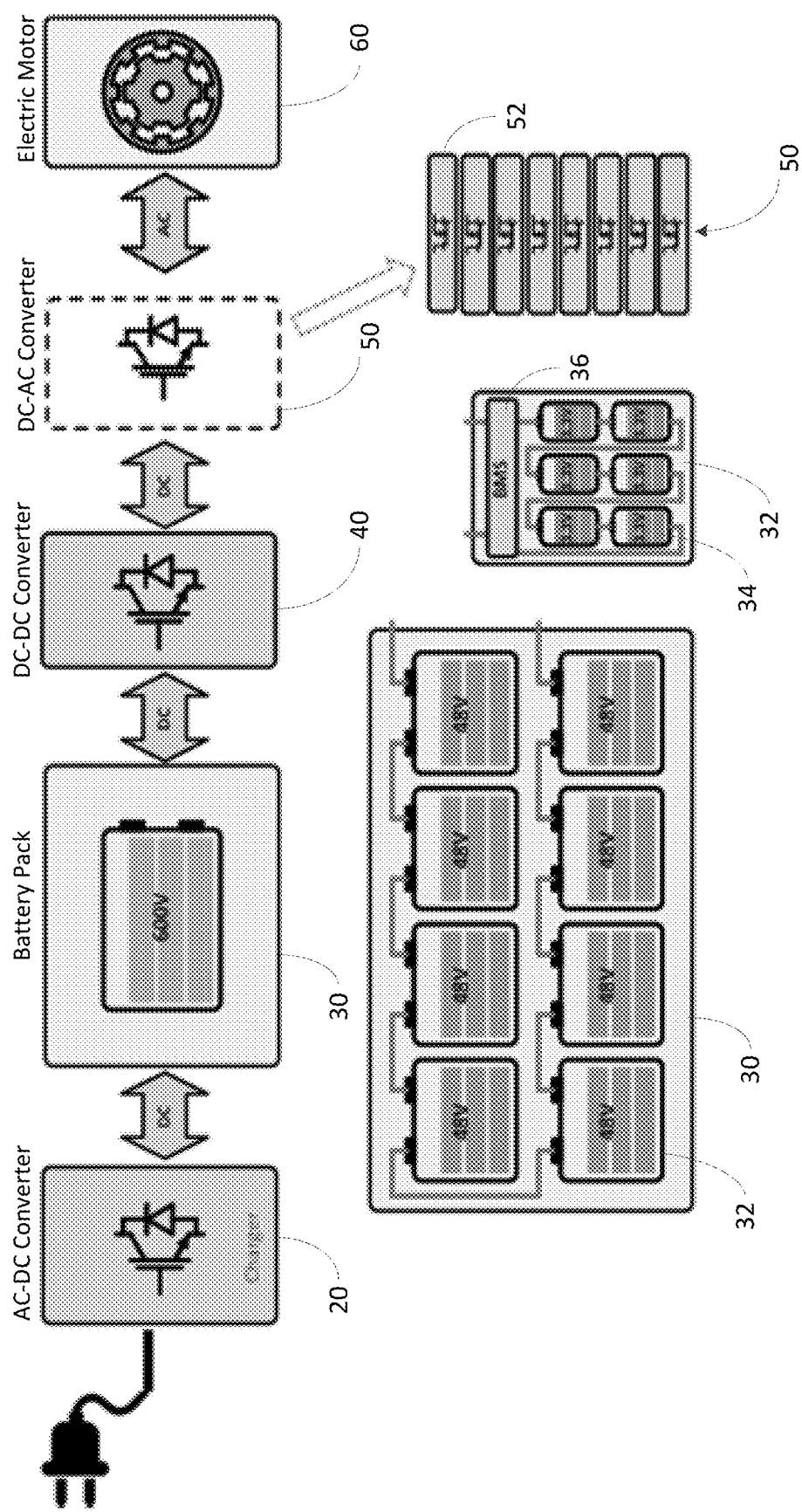
Figure 3D:
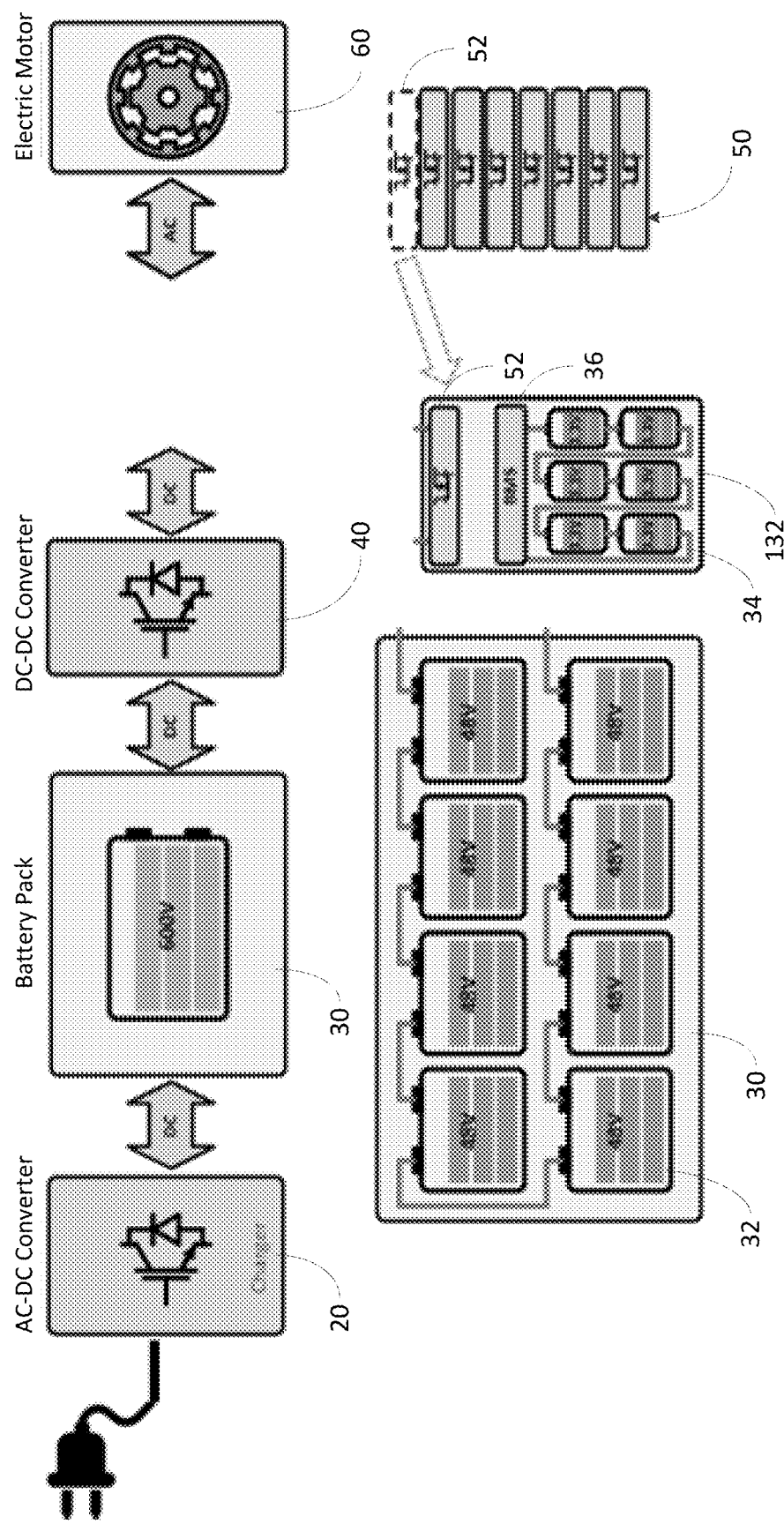
Figure 3E:
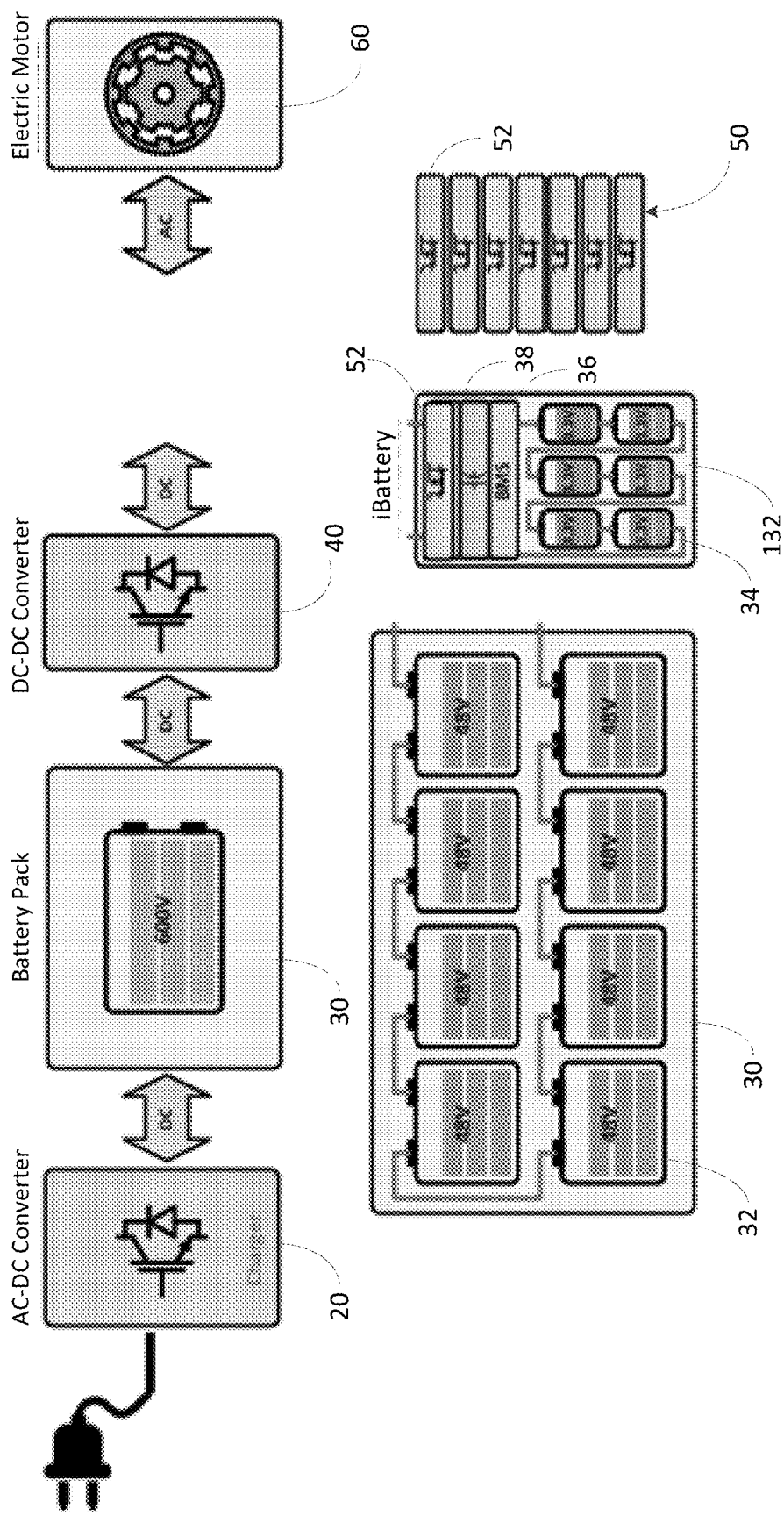

Turning to FIGS. 3A through 3I, a series of schematics illustrating simplification of the complex high voltage power electronic circuit 10 for conventional EVs shown in FIG. 1 to an intelligent or smart battery pack 130, as shown in FIG. 2, comprising an interconnected assembly of intelligent battery modules 132 according to exemplary embodiments of the present disclosure. As shown in FIG. 3A, the high voltage battery pack 30 comprising a serial chain of lower voltage battery modules 32, each of which comprises a series connection of lower voltage battery cells 34 and an integrated battery management and control system 36 as shown in FIG. 3B. The high voltage DC/AC converter 50 can be split into multiple low voltage DC/AC converters 52 connected in series as shown in FIG. 3C. Each of the individual low voltage DC/AC converters 52 can be integrated within an individual battery module to form a smart or intelligent battery module 132 as shown in FIG. 3D. To intermittently store an in-rush of braking power, FIG. 3E shows an ultra-capacitor 38 integrated within an individual intelligent battery module 132 (see also, e.g., FIG. 4). As depicted in FIG. 3F, a high voltage intelligent battery pack 130 comprises an interconnected assembly of intelligent battery modules 132. As shown in FIGS. 3G and 3H, the high voltage intelligent battery pack 130 effectively eliminates the need for the DC/DC converter 40. As shown in FIGS. 3H and 3I, the high voltage intelligent battery pack 130, which is effectively an intelligent modular AC battery pack 130, effectively eliminates the need for the AC/DC converter/charger 20.

Intelligent Battery Module Architecture

Figure 4:
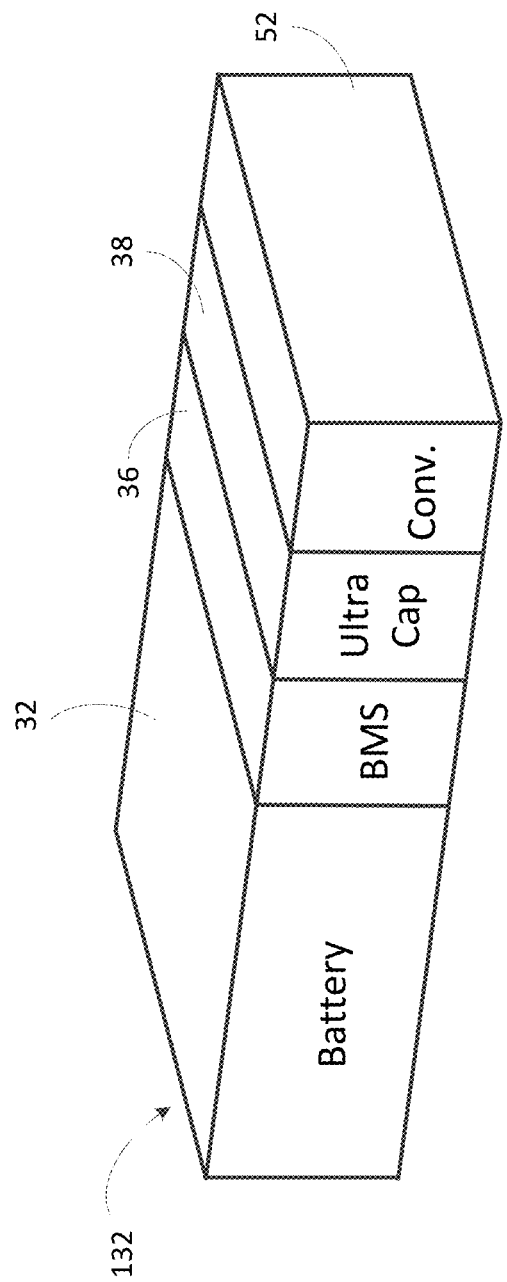
FIG. 4 illustrates a perspective view conceptual representation of an intelligent battery module comprising a battery integrated with a battery management and control system, a low voltage converter and an ultra-capacitor according to embodiments of the present disclosure.
Figure 5:
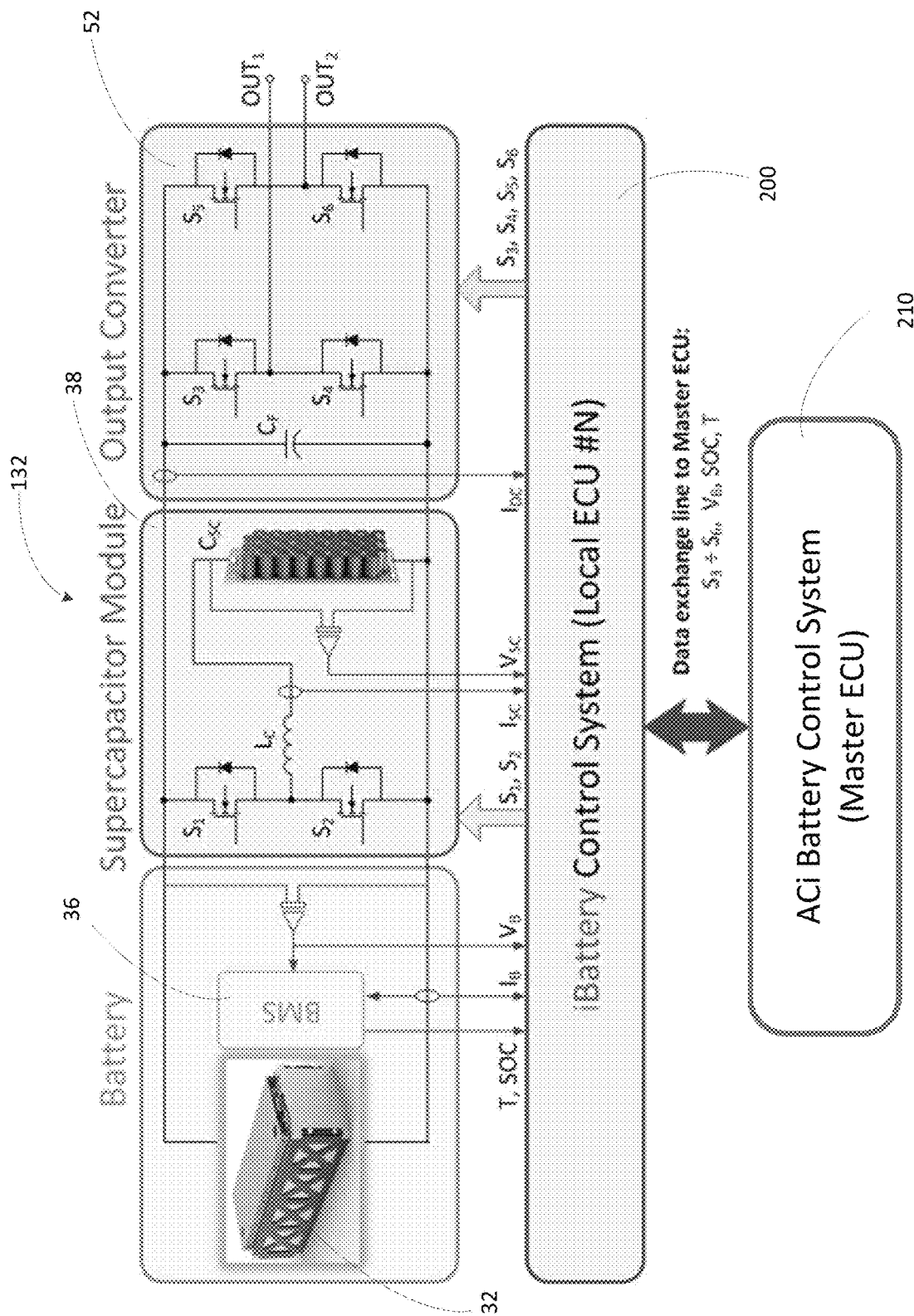
FIG. 5 illustrates a schematic diagram of an intelligent battery module according to embodiments of the present disclosure coupled to a battery module control system (or local electronic control unit (ECU)) and a master control system (or master ECU).

FIGS. 4 and 5 show a perspective view and a diagram, respectively, of an intelligent battery module 132 with the regenerative braking/acceleration capability using supercapacitors (or ultracaps). It has three main components: the battery 32 with a BMS 36, the supercapacitor module 38 with bidirectional DC-DC converter based on MOSFET Transistors (MOSFETs) S1 and S2 with supercapacitor bank CSC and coupling inductor LC, and the output converter 52 based on four-quadrant H-bridge topology with four MOSFETs $S_3$-$S_6$. As shown in FIG. 5, the intelligent battery module 132 is coupled to a battery module control system 200 (or local electronic control unit (ECU)) and a master control system 210 (or master ECU).

ACi Battery Pack Principle of Operation

Figure 6:
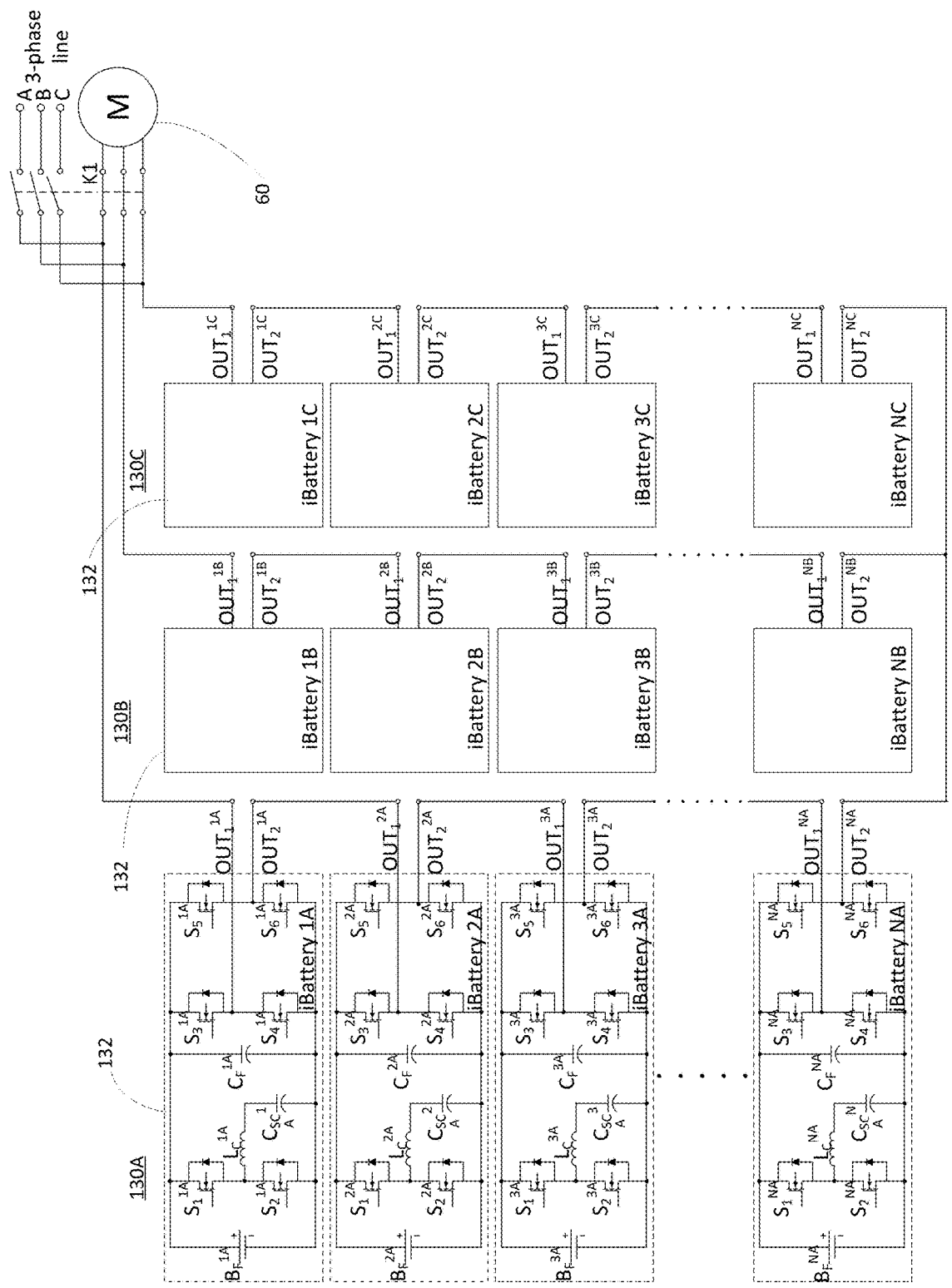
FIG. 6 illustrates a schematic diagram of multiple intelligent modular AC battery packs according to embodiments of the present disclosure coupled to a three phase motor and a charging coupling for coupling to a single or three phase grid or power source.
Figure 7A:
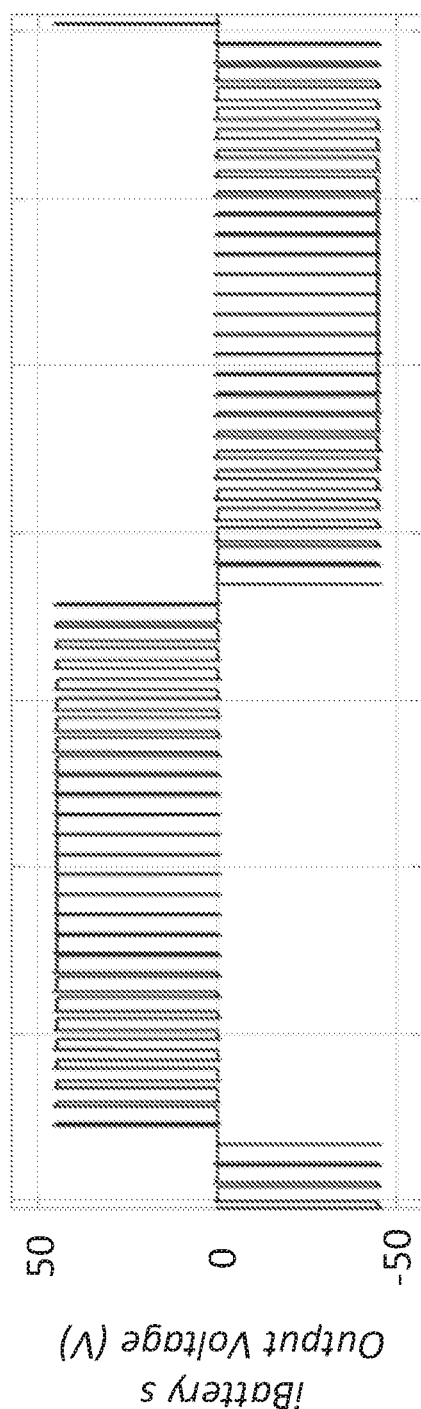
FIGS. 7A and 7B illustrate graphs of typical waveforms of output voltages for one (1) intelligent battery module (FIG. 7A) and one (1) phase of the intelligent modular AC battery pack with six (6) intelligent battery modules connected in series in each phase (FIG. 7B).
Figure 7B:
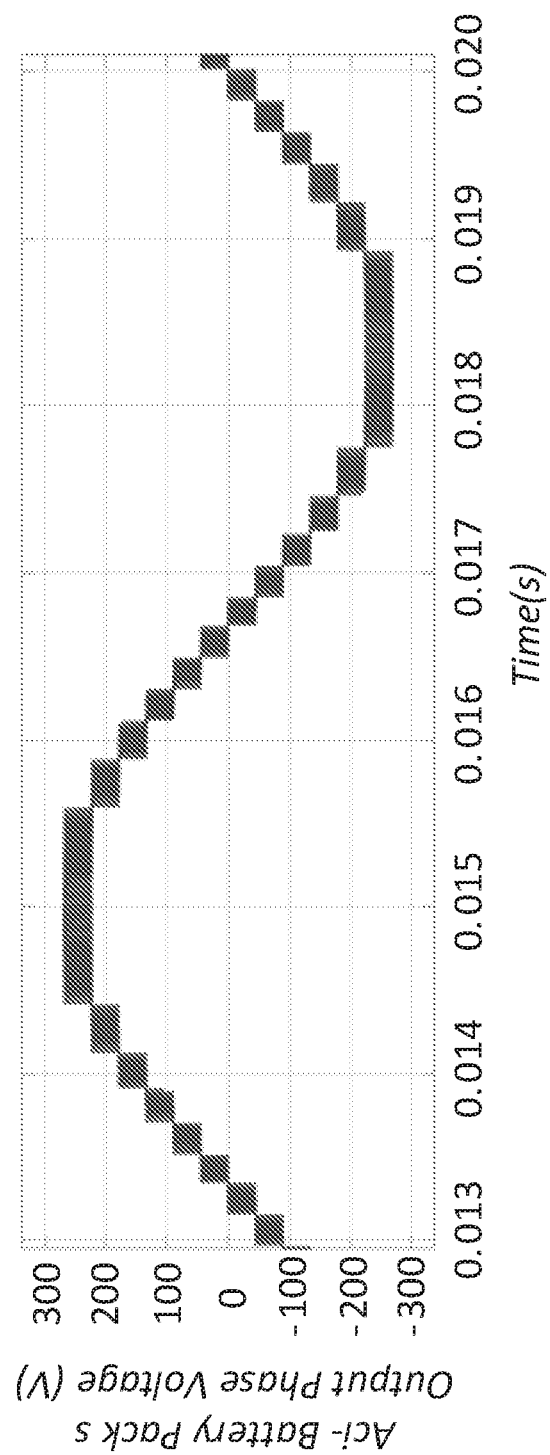

FIG. 6 depicts a topology of 3-phase ACi battery pack (130A, 130B, 130C) connected to the motor 60 and comprising N intelligent battery modules connected in series in each phase. Each intelligent battery module in FIGS. 5 and 6 can generate three different voltage outputs, $+V_{dc}$, 0, and $-V_{dc}$ by connecting the DC-voltage (of battery) VDC to the AC output by different combinations of the four switches, $S_3$, $S_4$, $S_5$, and $S_6$. To obtain $+V_{dc}$, switches $S_3$ and $S_6$ are turned on, whereas $-V_{dc}$ can be obtained by turning on switches $S_4$ and $S_5$. By turning on $S_3$ and $S_5$ or $S_4$ and $S_6$, the output voltage is 0. The AC outputs of each of the different output converter levels are connected in series such that the synthesized voltage waveform is the sum of the inverter outputs. The number of output phase voltage levels m in ACi battery pack is defined by m=2s+1, where s is the number of intelligent battery modules. An example phase voltage waveform for pulse width modulation (PWM) modulated 13-level ACi battery pack with six intelligent battery modules connected in series in each phase is presented in FIG. 7B and an output voltage of one of the intelligent battery modules 132 is shown in FIG. 7A.

The ACi battery pack can also serve as a rectifier/charger for the batteries of the intelligent battery modules 132 while the vehicle is connected to an AC supply as shown in FIG. 6.

The switching signals $S_3$-$S_6$ (See FIGS. 5 and 6) for the switches $S_3$-$S_6$ of the output converter 152 in each intelligent battery module 132 may be generated in different ways depending on the flexibility and requirements of the adopted control hardware. One approach is to use space vector modulation or sine PWM to generate the reference voltage for each phase of the intelligent battery module 132. The switching signals for each intelligent battery module's output converter may then be generated using phase shifted carrier technique. This technique ensures that the cells are continuously rotated, and the power is almost equally distributed among them.

Modulation of Output Voltage in ACi Battery Pack Multi-Level PWM Modulation

Figures 8A, 8B, 8C, 8D:
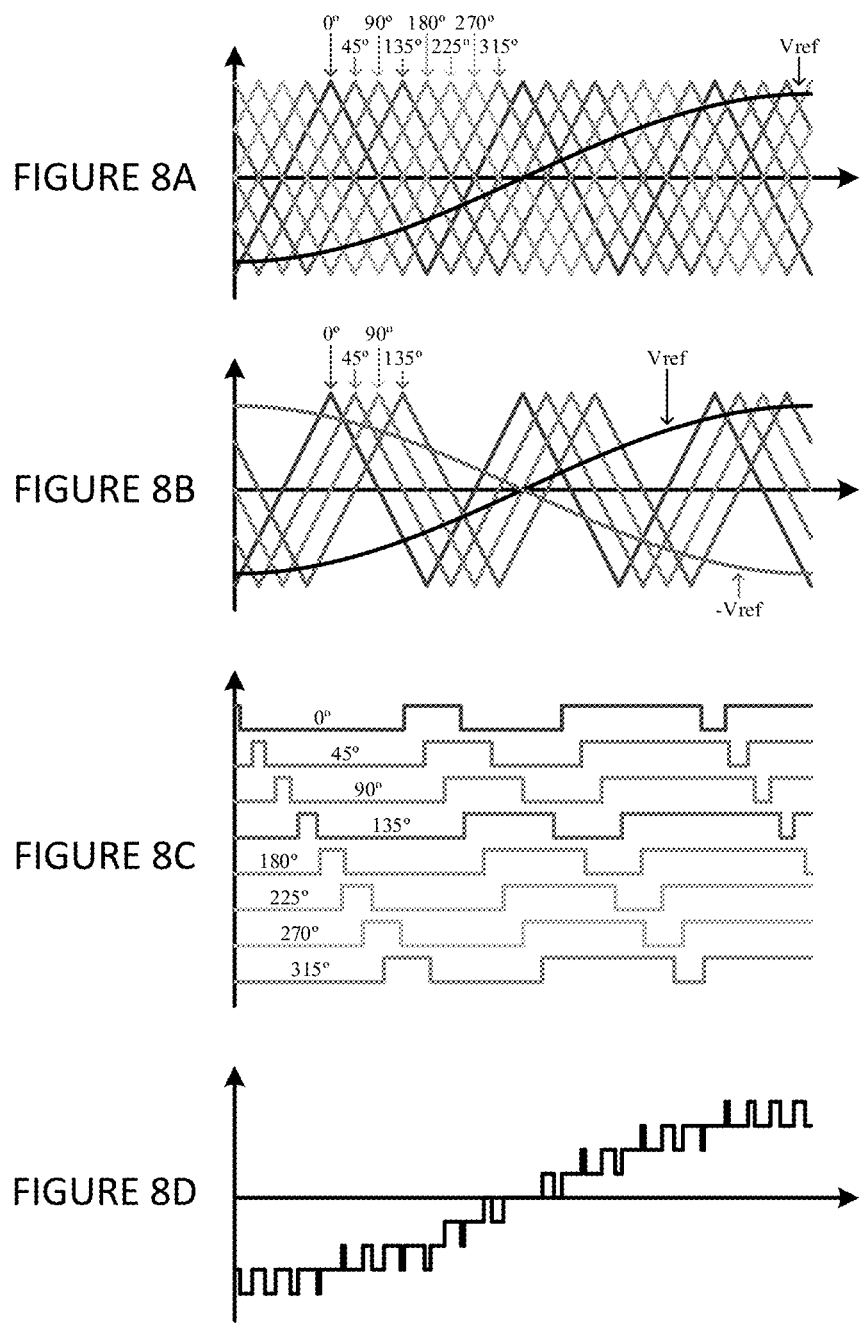
FIGS. 8A, 8B, 8C and 8D illustrate graphs showing the principle of phase shifted carrier technique.

The principle of the phase shifted technique is to generate the multilevel output PWM waveform using incrementally shifted two-level waveforms. Therefore, an N-level PWM waveform is created by the summation of N−1 two-level PWM waveforms. These two-level waveforms are generated by comparing the reference waveform to triangular carriers that are incrementally shifted by 360°/(N−1). A 9-level example is shown in FIG. 8A. The carriers are incrementally shifted by 360°/(9−1)=45° and compared to the reference waveform. The resulted two-level PWM waveforms are shown in FIG. 8C. These two-level waveforms may be used as the gate signals for the output converter (H-Bridge) MOSFETs in each intelligent battery module. For our 9-level example, which comprises four H-bridges, the 0° signal is used for $S_3$ and 180° signal for $S_6$ of the first module, the 45° signal is used for $S_3$ and 225° signal for $S_6$ of the second module, and so on. Note that in all H-bridges, the signal for $S_4$ is complementary to $S_3$ and the signal for $S_5$ is complementary to $S_6$ along with certain dead-time to avoid shoot through of each leg.

Depending on the resources and limitations of the hardware that is used to implement the modulation, an alternative is to generate the negative reference signal along with the first (N−1)/2 carriers. The 9-level example is shown in FIG. 8B. In this case, the 0° to 135° PWM signals are generated by comparing $V_{ref}$ to the corresponding carriers and the 180° to 315° PWM signals are generated by comparing $-V_{ref}$ to carriers of 0° to 135°. However, the logic of the comparison in the latter case must be reversed.

Other techniques such as a state machine decoder may also be used to generate the gate signals for the H-bridges.
Modulation of Output Voltage in ACi Battery Pack—Multi-Level Hysteresis Control Another approach to creating the switching signals $S_3$–$S_6$ (See FIGS. 5 and 6) for the output converter's switches in each intelligent battery module is a multi-level hysteresis control technique. This control method can be used with any type of motor and is very efficient especially for switched reluctance motor (SRM) drives.

The multi-level hysteresis control is described here for only one of three phases of the three phase ACi battery pack. In case of PMSM motor, three controllers have to be used together with additional circulation current reduction block (not described here). For a SRM motor a number of controllers can be more than three and there is no need in a circulation current reduction block.

For 9-level ACi battery pack (see FIG. 6) comprising four intelligent battery modules 132 connected in series in each phase, all possible switching states for output converter's switches with corresponding output voltage levels are presented in Table 1. Only switching states for odd switching elements (MOSFETs $S_3^N$ and $S_5^N$, where N=1, 2, 3, 4 is a number of intelligent battery module) are presented in this table. In fact, to avoid a short circuit of the filtering capacitor $C_F^N$ only one switch in a half-bridge of output H-bridge converter can be ON (in conducting mode) at any moment of time. Thus, the control signals for even switching elements (MOSFETs $S_4^N$ and $S_6^N$, where N=1, 2, 3, 4 is a number of intelligent battery module) can be easily obtained by reversing the states of odd switching elements of the same half-bridge. For example, if $S_3^N=1$ and $S_5^N=0$, then $S_4^N=0$ and $S_6^N=1$.

TABLE 1

Switching States of 9-level 4-quadrant Multilevel Cascaded Converter

| Output Voltage | $S_3^1$ | $S_5^1$ | $S_3^2$ | $S_5^2$ | $S_3^3$ | $S_5^3$ | $S_3^4$ | $S_5^4$ |
|---|---|---|---|---|---|---|---|---|
| −4VDC | 0 | 1 | 0 | 1 | 0 | 1 | 0 | 1 |
| −3VDC | | | | | | | | |
| −3VDC1 | 1 | 1 | 0 | 1 | 0 | 1 | 0 | 1 |
|  | 0 | 0 | 0 | 1 | 0 | 1 | 0 | 1 |
| −3VDC2 | 0 | 1 | 1 | 1 | 0 | 1 | 0 | 1 |
|  | 0 | 1 | 0 | 0 | 0 | 1 | 0 | 1 |
| −3VDC3 | 0 | 1 | 0 | 1 | 1 | 1 | 0 | 1 |
|  | 0 | 1 | 0 | 1 | 0 | 0 | 0 | 1 |
| −3VDC4 | 0 | 1 | 0 | 1 | 0 | 1 | 1 | 1 |
|  | 0 | 1 | 0 | 1 | 0 | 1 | 0 | 0 |
| −2VDC | | | | | | | | |
| −2VDC12 | 1 | 1 | 1 | 1 | 0 | 1 | 0 | 1 |
|  | 0 | 0 | 0 | 0 | 0 | 1 | 0 | 1 |
| −2VDC13 | 1 | 1 | 0 | 1 | 1 | 1 | 0 | 1 |
|  | 0 | 0 | 0 | 1 | 0 | 0 | 0 | 1 |
| −2VDC14 | 1 | 1 | 0 | 1 | 0 | 1 | 1 | 1 |
|  | 0 | 0 | 0 | 1 | 0 | 1 | 0 | 0 |
| −2VDC23 | 0 | 1 | 1 | 1 | 1 | 1 | 0 | 1 |
|  | 0 | 1 | 0 | 0 | 0 | 0 | 0 | 1 |
| −2VDC24 | 0 | 1 | 1 | 1 | 0 | 1 | 1 | 1 |
|  | 0 | 1 | 0 | 0 | 0 | 1 | 0 | 0 |
| −1VDC | | | | | | | | |
| −1VDC1 | 0 | 1 | 1 | 1 | 1 | 1 | 1 | 1 |
|  | 0 | 1 | 0 | 0 | 0 | 0 | 0 | 0 |
| −1VDC2 | 1 | 1 | 0 | 1 | 1 | 1 | 1 | 1 |
|  | 0 | 0 | 0 | 1 | 0 | 0 | 0 | 0 |
| −1VDC3 | 1 | 1 | 1 | 1 | 0 | 1 | 1 | 1 |
|  | 0 | 0 | 0 | 0 | 0 | 1 | 0 | 0 |
| −1VDC4 | 1 | 1 | 1 | 1 | 1 | 1 | 0 | 1 |
|  | 0 | 0 | 0 | 0 | 0 | 0 | 0 | 1 |
| 0 | 1 | 1 | 1 | 1 | 1 | 1 | 1 | 1 |
|  | 0 | 0 | 0 | 0 | 0 | 0 | 0 | 0 |
| +1VDC | | | | | | | | |
| +1VDC1 | 1 | 0 | 1 | 1 | 1 | 1 | 1 | 1 |
|  | 1 | 0 | 0 | 0 | 0 | 0 | 0 | 0 |
| +1VDC2 | 1 | 1 | 1 | 0 | 1 | 1 | 1 | 1 |
|  | 0 | 0 | 1 | 0 | 0 | 0 | 0 | 0 |
| +1VDC3 | 1 | 1 | 1 | 1 | 1 | 0 | 1 | 1 |
|  | 0 | 0 | 0 | 0 | 1 | 0 | 0 | 0 |
| +1VDC4 | 1 | 1 | 1 | 1 | 1 | 1 | 1 | 0 |
|  | 0 | 0 | 0 | 0 | 0 | 0 | 1 | 0 |
| +2VDC | | | | | | | | |
| +2VDC12 | 1 | 1 | 1 | 1 | 1 | 0 | 1 | 0 |
|  | 0 | 0 | 0 | 0 | 1 | 0 | 1 | 0 |
| +2VDC13 | 1 | 1 | 1 | 0 | 1 | 1 | 1 | 0 |
|  | 0 | 0 | 1 | 0 | 0 | 0 | 1 | 0 |
| +2VDC14 | 1 | 1 | 1 | 0 | 1 | 0 | 1 | 1 |
|  | 0 | 0 | 1 | 0 | 1 | 0 | 0 | 0 |
| +2VDC23 | 1 | 0 | 1 | 1 | 1 | 1 | 1 | 0 |
|  | 1 | 0 | 0 | 0 | 0 | 0 | 1 | 0 |
| +2VDC24 | 1 | 0 | 1 | 1 | 1 | 0 | 1 | 1 |
|  | 1 | 0 | 0 | 0 | 1 | 0 | 0 | 0 |
| +3VDC | | | | | | | | |
| +3VDC1 | 1 | 1 | 1 | 0 | 1 | 0 | 1 | 0 |
|  | 0 | 0 | 1 | 0 | 1 | 0 | 1 | 0 |
| +3VDC2 | 1 | 0 | 1 | 1 | 1 | 0 | 1 | 0 |
|  | 1 | 0 | 0 | 0 | 1 | 0 | 1 | 0 |
| +3VDC3 | 1 | 0 | 1 | 0 | 1 | 1 | 1 | 0 |
|  | 1 | 0 | 1 | 0 | 0 | 0 | 1 | 0 |
| +3VDC4 | 1 | 0 | 1 | 0 | 1 | 0 | 1 | 1 |
|  | 1 | 0 | 1 | 0 | 1 | 0 | 0 | 0 |
| +4VDC | 1 | 0 | 1 | 0 | 1 | 0 | 1 | 0 |

Zero output voltage 0 VDC can be ensured if all cells operate at zero state at the same time. This can be obtained bypassing the battery by switching ON either both upper switches or both lower switches. For instance, for intelligent battery module 1: $S_3^1=1$, $S_5^1=1$, $S_4^1=0$, $S_6^1=0$ or $S_3^1=0$, $S_5^1=0$, $S_4^1=1$, $S_6^1=1$.

Both voltage levels −3 VDC and +3 VDC can be obtained using four various combinations ±3 VDC1, ±3 VDC2, ±3 VDC3, ±3 VDC4, where the last index corresponds to a number of intelligent battery module operating at zero state, providing output zero voltage. In turn, each zero state can be coded using two mentioned above combinations of switching. Thus, there are eight possible combinations of setting ±3 VDC output voltage level.

Similarly, both voltage levels −2 VDC and +2 VDC can be set by five different combinations ±2 VDC12, ±2 VDC13, ±2 VDC14, ±2 VDC23, ±2 VDC24 depending on which two intelligent battery modules operate at zero state voltage. Taking into account a dual possibility of providing a zero state, a total number of possible combinations for ±2 VDC is equal to ten.

Both voltage levels −1 VDC and +1 VDC can be obtained using four various combinations ±1 VDC1, ±1 VDC2, ±1

VDC3, ±1 VDC4. The last index corresponds to a number of intelligent battery modules operating at ±1 VDC level. Again, each zero state is obtained dually. Thus, like for ±3 VDC level, there are eight possible combinations of providing ±1 VDC output voltage level.

Finally, the maximum voltage levels −4 VDC and +4 VDC can be provided at the output of converter's phase, when all intelligent battery module in phase are operating at the same time. Thus, there is only one available combination of switching state for each these cases.

Selection of Voltage Levels in Hysteresis Control

Previously it was explained how every voltage level of nine-level ACi battery pack can be obtained by different switching combinations of output converters of four intelligent battery modules 142. But the most significant task for a multi-level hysteresis controller is the identification of an appropriate output voltage level at any moment of converter operation based on a current feedback (motor phase) signal $I_{REAL}$.

Figure 9:
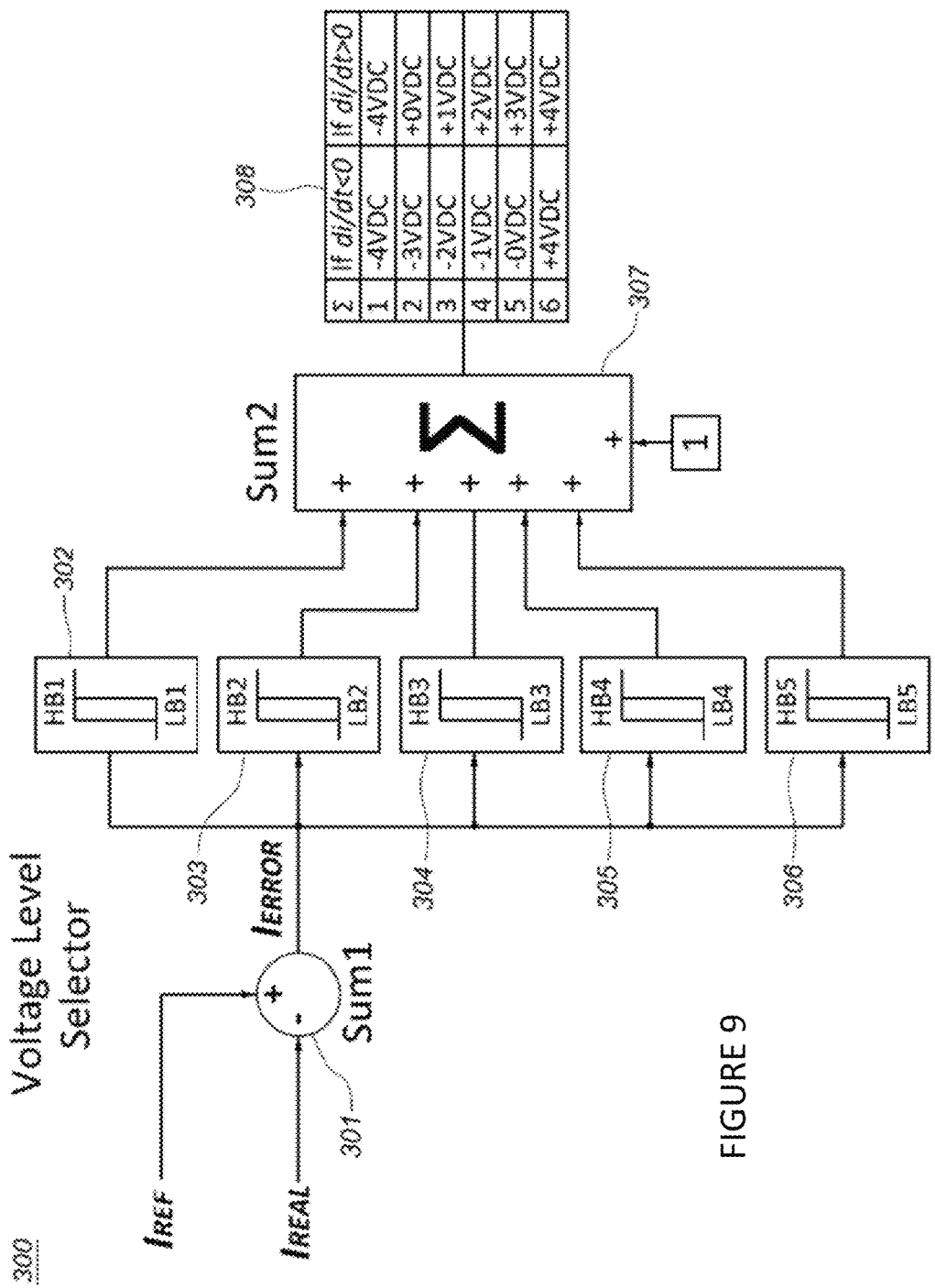
FIG. 9 illustrates a schematic of a functional diagram of voltage level selector of a nine-level four-quadrant hysteresis controller.

A block diagram of voltage level selector 300 is presented in FIG. 9. The voltage level selector comprises two sum blocks Sum1 301 and Sum2 307, five hysteresis blocks 302, 303, 304, 305 and 306, and one lookup table for voltage level determination. The real feedback current signal $I_{REAL}$ is subtracted from the reference current $I_{REF}$ and the current error signal $I_{ERROR}$ as their difference comes to the input of all five hysteresis blocks. Each of these blocks has different settings of high (HB) and low (LB) boundary thresholds as presented in Table 2, where $\Delta I$ is preset value of maximum permitted current error. When $I_{ERROR}$ reaches the corresponding high boundary (HB) of the hysteresis block, its output value is set to "1" and remains at this level until $I_{ERROR}$ crosses its low boundary (LB). This will set "0" at the output of hysteresis block and the output is maintained at this level until $I_{ERROR}$ reaches HB again. Thus, if low and high boundaries of five Hysteresis Blocks are distributed within a range between $-\Delta I$ and $+\Delta I$ (as shown in Table 2), then the output of Sum2 will be varying from 1 to 6, depending on $I_{ERROR}$ value. A look-up table 308 presented in FIG. 9 is used for determination of the required output voltage level based on the total state value (output of Sum2) of the hysteresis blocks and taking into account a sign of the real (or reference) current derivative di/dt. As discussed below, a sign of di/dt can be determined as positive at the moment of time, when Sum2 reaches a value of 6, and will be changed to a negative one, when Sum2 becomes equal to 1.

TABLE 2

Current Threshold Levels for Hysteresis Blocks

| Hysteresis Boundary | Current threshold |
| --- | --- |
| HB1 | $\Delta I/5$ |
| LB1 | $-\Delta I/5$ |
| HB2 | $2\Delta I/5$ |
| LB2 | $-2\Delta I/5$ |
| HB3 | $3\Delta I/5$ |
| LB3 | $-3\Delta I/5$ |
| HB4 | $4\Delta I/5$ |
| LB4 | $-4\Delta I/5$ |
| HB5 | $\Delta I$ |
| LB5 | $-\Delta I$ |

Switching Between Voltage Levels in Nine-Level Four-Quadrant Hysteresis Control

A detailed description of the main principle of switching between voltage levels in a nine-level four-quadrant hysteresis control technique for one phase of nine-level ACi battery Pack operation is presented below.

Figure 10A:
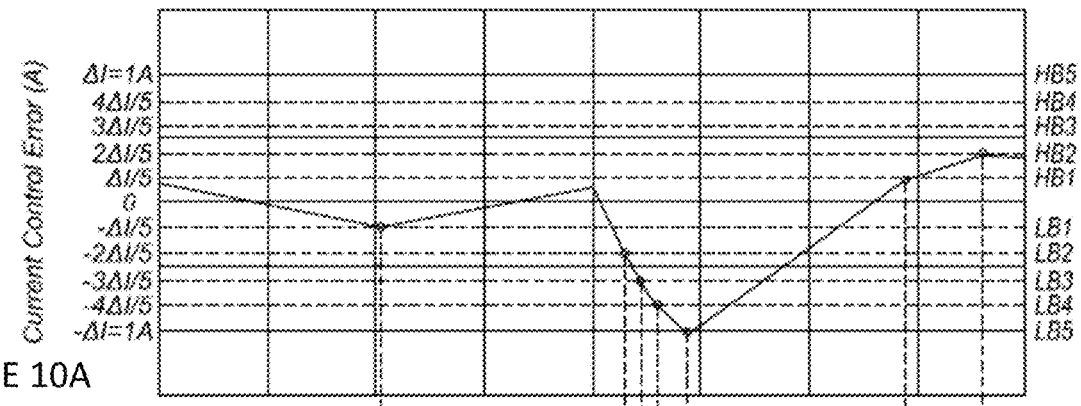
FIGS. 10A, 10 B and 10C illustrates graphs showing the operation of a nine-level four-quadrant hysteresis controller.
Figure 10B:
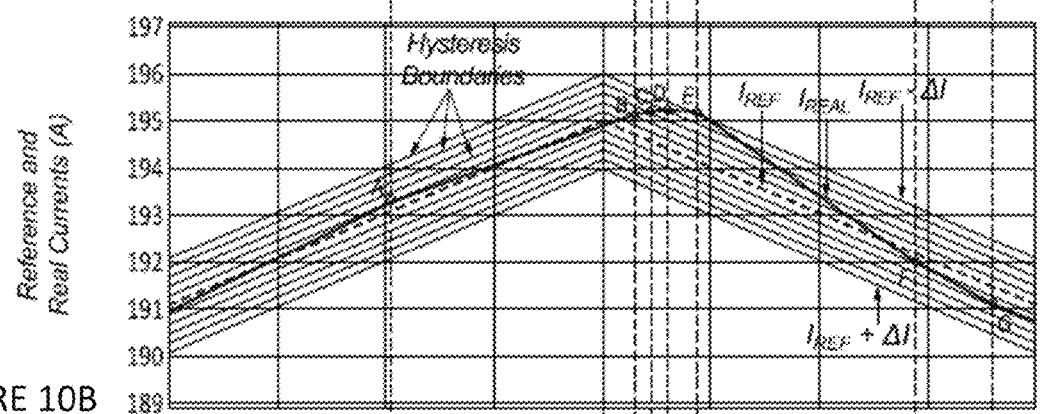
FIG. 10C illustrates the converter output voltage $V_{OUT}$.

In FIG. 10B the reference current $I_{REF}$ (red trace) and real current $I_{REAL}$ (blue trace) in motor phase are presented together with five positive (HB1÷HB5) and five negative (LB1÷LB5) hysteresis boundaries (see Table 2 and FIG. 10A also), equally distributed between $I_{REF}-\Delta I$ and $I_{REF}+\Delta I$ and separated by $\Delta I/5$ from each other (green traces). The current control error $I_{ERROR}$, as a difference between $I_{REAL}$ and $I_{REF}$, and the converter output voltage $V_{OUT}$ are presented in FIGS. 10(a) and 10(c), respectively.

The initial status of $V_{OUT}$ in the considered time window (from 23.06 ms) was set previously by the control system at +4 VDC (where VDC=80V). At this voltage level the current $I_{REAL}$ is rising up, and when $I_{ERROR}$ hits the first hysteresis boundary LB1 at point A (level $-\Delta I/5$ in FIG. 10(a)), the output states of first hysteresis block is changed from "1" to "0", hence a sum at the output of Sum2 block is reduced by one from "6" to "5" (FIG. 9). And according to the table in FIG. 9 for di/dt>0, the voltage $V_{OUT}$ becomes +3 VDC.

Figure 10C:
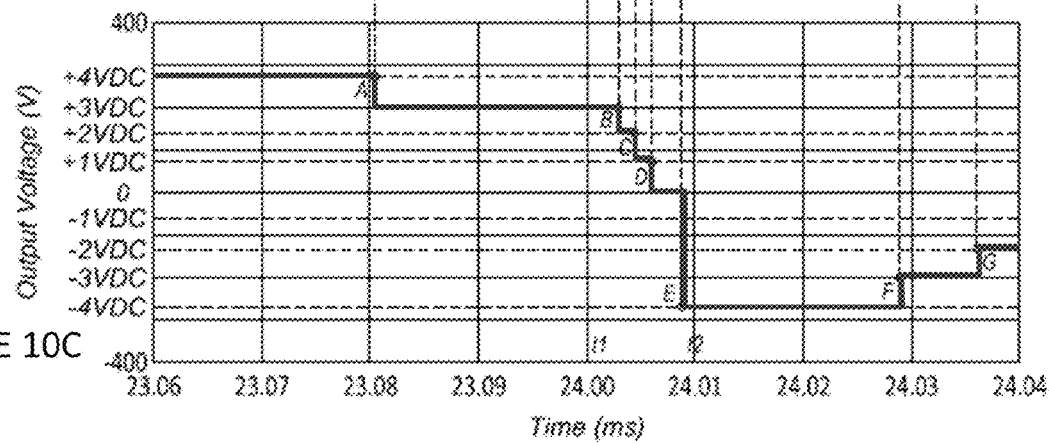

From the beginning of considered time window and up to time t1 (FIG. 10C), the current $I_{REF}$ has a positive di/dt value and hysteresis controller shall operate with voltage levels presented in the second column of look-up table in FIG. 10C (di/dt>0). Starting from t1 the di/dt sign of current $I_{REF}$ is negative, but hysteresis controller remains operating as for positive di/dt until time t2, when $I_{ERROR}$ hits a fifth hysteresis boundary LB5 and Sum2=1. This event will switch an operation of hysteresis controller to the first column of the table for di/dt<0. In other words, a sign of di/dt can be determined as negative at the moment (t2), when Sum2 reaches a value of "1" (and will be changed to a positive, when Sum2 becomes equal to "6"). This logic is implemented in di/dt estimator block, which will be presented as described in the next sections of this document.

While $V_{OUT}$ is at its maximum negative level −4 VDC, the current $I_{REAL}$ is falling down (FIG. 10(b)) and when it hits point F, which corresponds to the first hysteresis boundary HB1 in FIG. 10(a), the output states of first hysteresis block is changed from "0" to "1", hence a sum at the output of Sum2 is increased by one from "1" to "2" (FIG. 9). And according to look-up table in FIG. 9 for di/dt<0, the voltage $V_{OUT}$ becomes −3 VDC. At point G, when $I_{REAL}$ and $I_{ERROR}$ reach HB2, Sum2 is incremented again and $V_{OUT}$ becomes −2 VDC.

In the hysteresis control method provided herein, the maximum current error $\Delta I$ takes place only at the points where di/dt value of the reference current $I_{REF}$ changes a sign. Beyond these critical points, the method works in such a way to minimize the current error $I_{ERROR}$ at $\Delta I/5$ as fast as possible at given parameters of the load.

Overall Method Description

Figure 11:
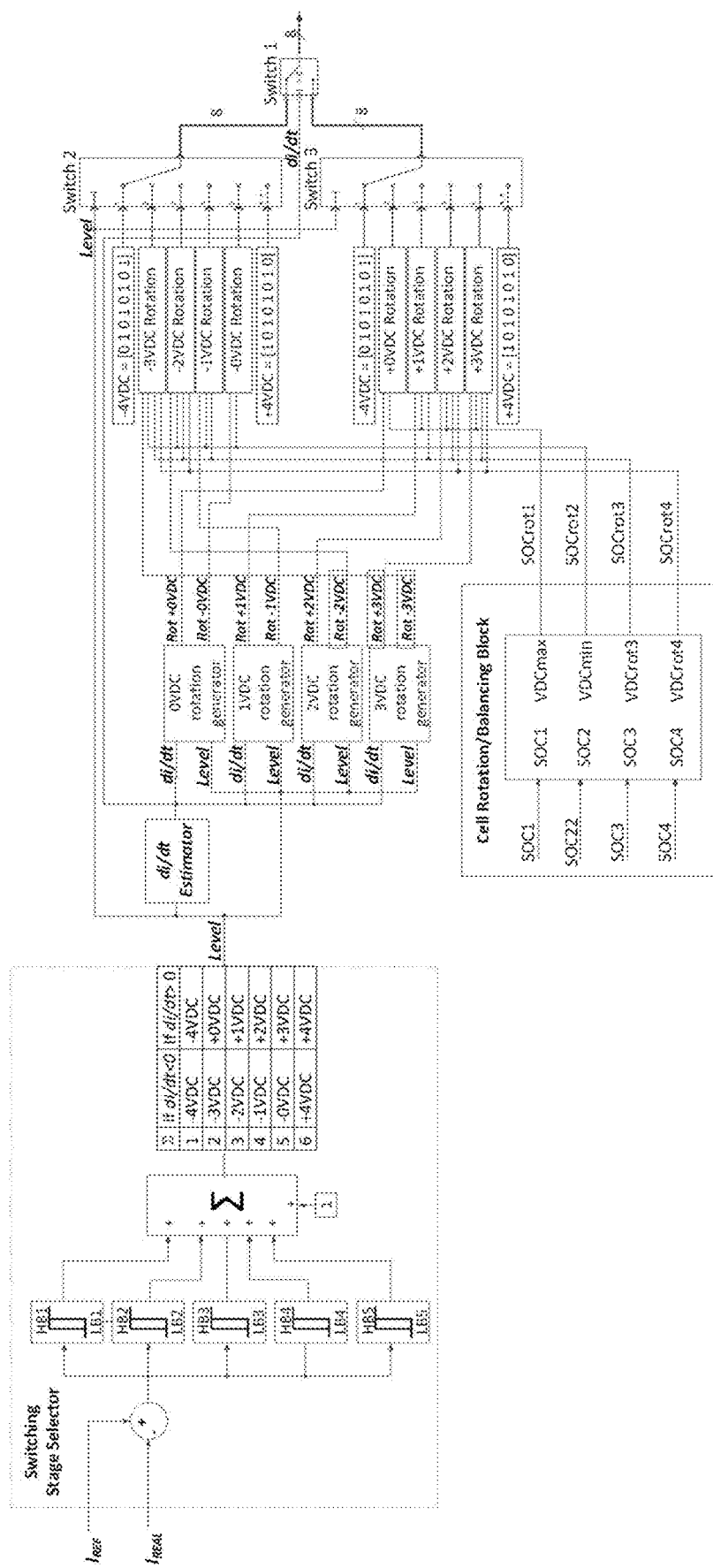
FIG. 11 illustrates a functional diagram of a 9-level, 4-quadrant hysteresis current controller with state of charge (SOC) balancing and zero state rotation.

The generalized functional diagram of a 9-level 4-quadrant hysteresis current controller 500 with state of charge balancing and zero state rotation is presented in FIG. 11. It includes the switch stage selector 300, which functions as described earlier. The output signal of Sum2 in FIG. 9 is named as "Level" in FIG. 11. This signal represents a numerical value for a general level (from 1 to 6) of a nine-level hysteresis controller, which is used further in the method to select an appropriate output voltage level of intelligent battery module's output converter.

Figure 13:
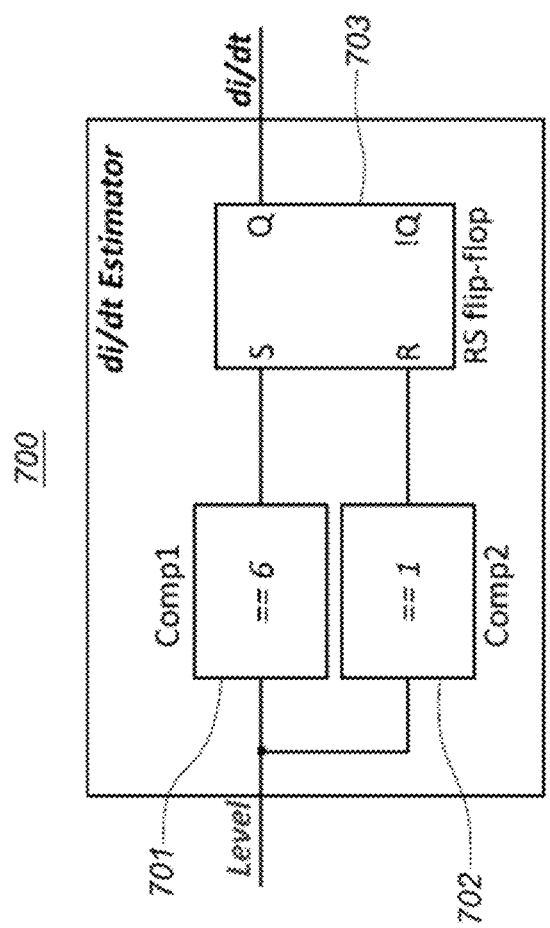
FIG. 13 illustrates a functional diagram of a di/dt Estimator.
Figure 14A:
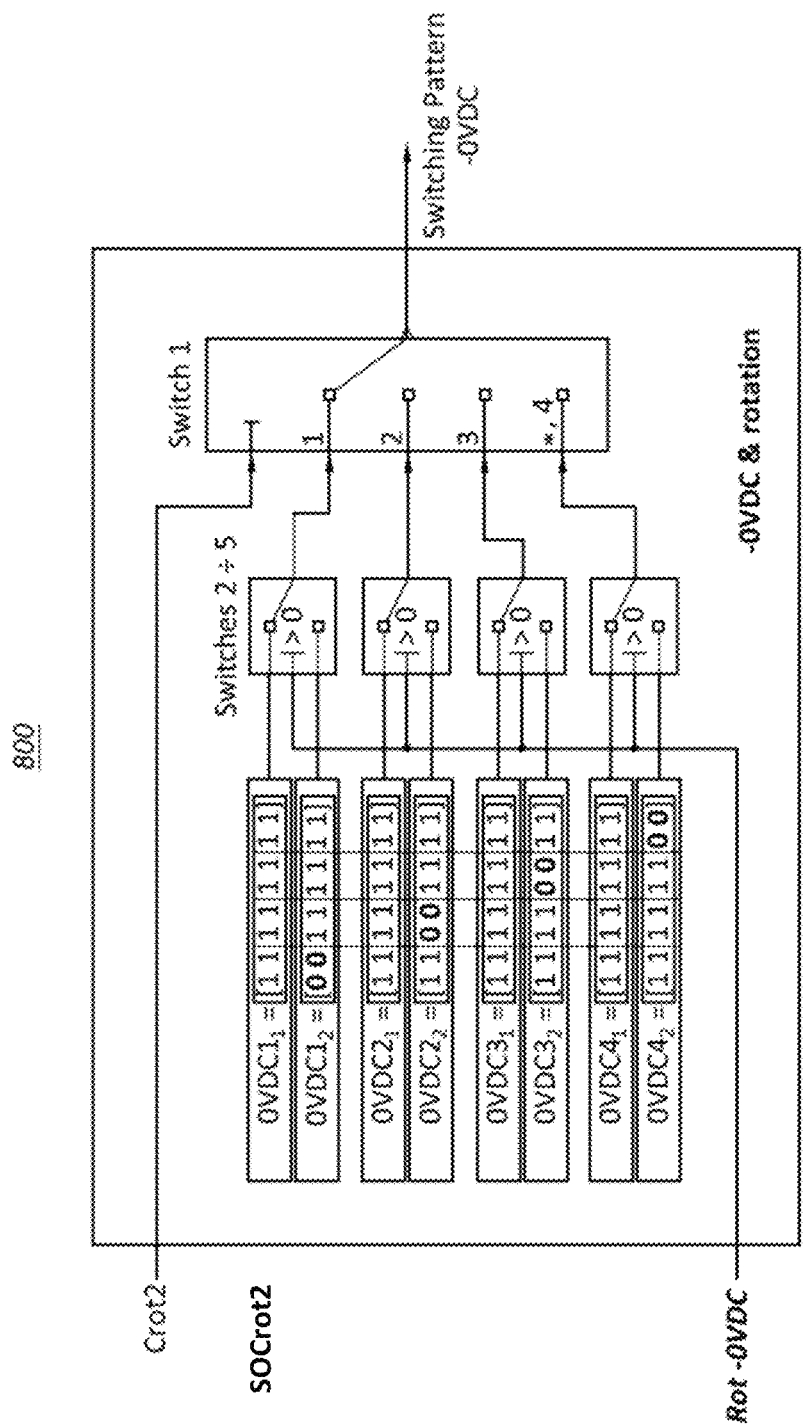
FIGS. 14A and 14B illustrate functional diagrams of −0 VDC Rotation (FIG. 14A) and +0 VDC Rotation (FIG. 14B) blocks.
Figure 14B:
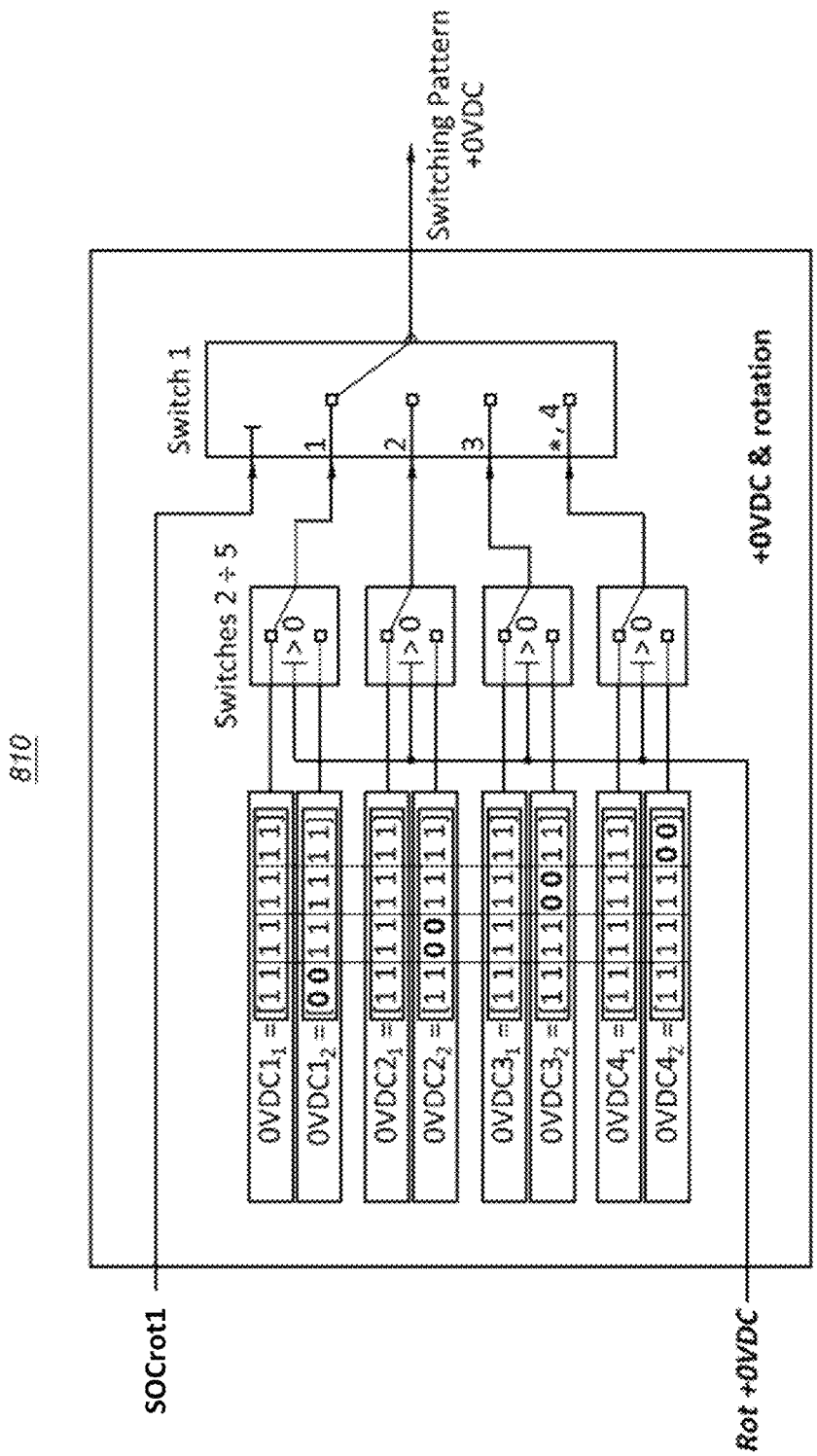
Figure 15A:
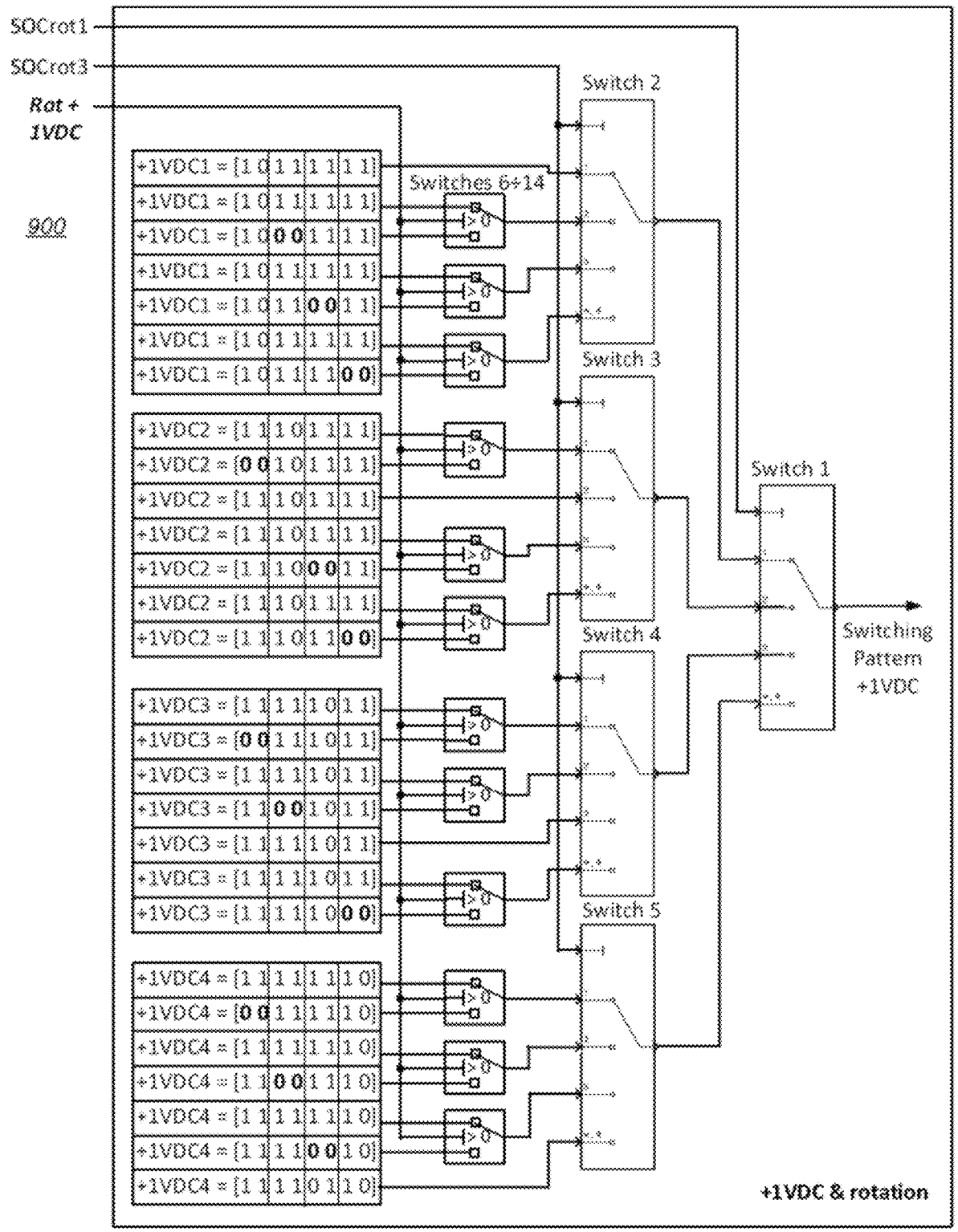
FIGS. 15A and 15B illustrate functional diagrams of +1 VDC Rotation (FIG. 15A) and −1 VDC Rotation (FIG. 15B) blocks.
Figure 15B:
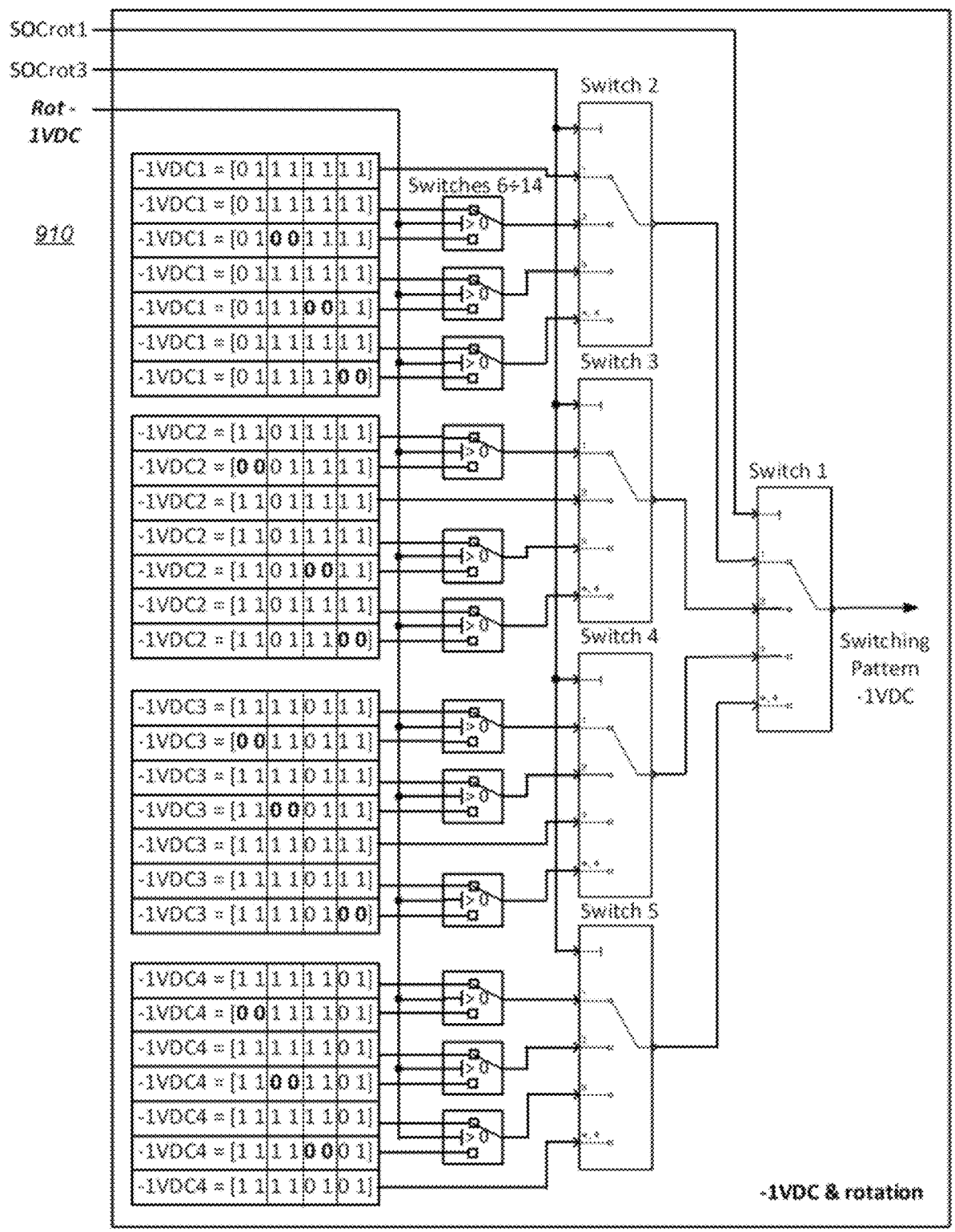

According to the look-up table in FIG. 9, knowledge of the di/dt sign is required to choose an appropriate output voltage level. As it was mentioned earlier, a sign of di/dt can be determined as negative at the moment, when "Level" reaches a value of "1", and will be changed to a positive, when "Level" becomes equal to "6". This logic is implemented in di/dt estimator block, shown in FIG. 13. The estimator block comprises two digital comparators (Comp 1 and Comp 2) and RS flip-flop element. Both comparators provide transition pulses from "false" to "true" at the moments, when "Level" signal is equal to "6" (Comp 1) and "1" (Comp 2). These rising edges are detected by RS flip-flop, which changes its output state accordingly, providing a "true" signal at its non-inverting output Q when di/dt>0, and "false" signal when di/dt<0.

Figure 12:
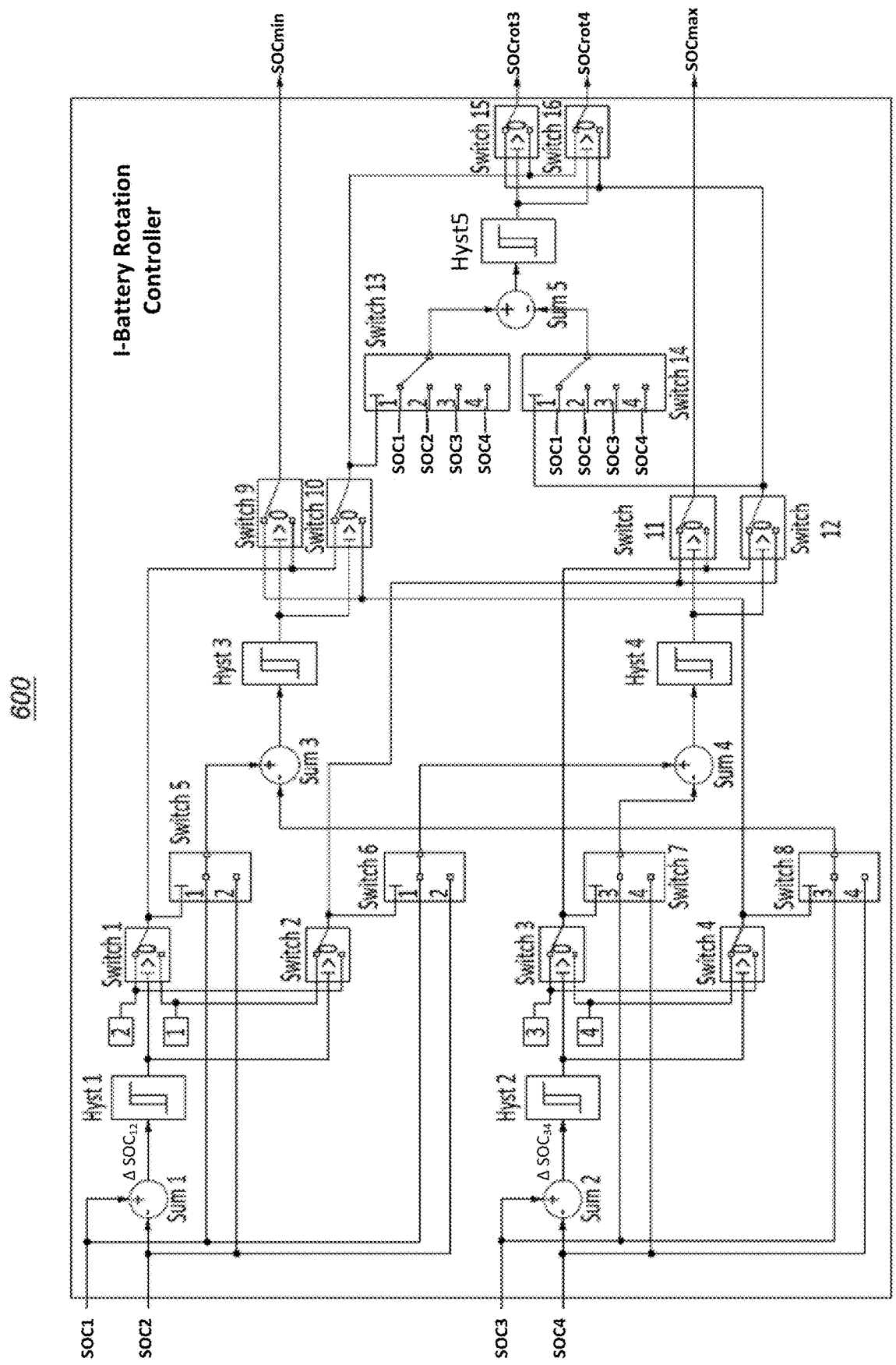
FIG. 12 illustrates a functional diagram of an intelligent battery module rotation controller.

As it was mentioned earlier and presented in Table 1, there are many switching states available for each voltage level of nine-level ACi battery pack, except of ±4 VDC, when all intelligent battery modules are involved in providing a maximum positive or negative output voltage. Thus, there are following major tasks, which have to be resolved controlling the current of the motor, taking into account that hysteresis "Level" and a sign of di/dt are already known parameters:

1) Based on the state of charge (SOC) of each intelligent battery module, an identification of the intelligent battery module which has to be switched repetitively for some period of time to provide the required output voltage level and regulation of output current. This identification methodology has to ensure a balancing of the state of charges during an operation of the ACi battery pack. When this is provided, the energy, stored in batteries, or transferred from or to the motor, is equally distributed among all intelligent battery modules. This is a necessary condition of correct operation of ACi battery pack, where each cell has to be designed for a specific temperature profile of semiconductor switches based on their operational regimes. This task is performed by SOC balancing block (see FIG. 11) in the method provided herein, and the functional diagram of intelligent battery module rotation controller 600 as this block's main component is presented in FIG. 12.

2) For the intelligent battery module, identified by SOC balancing block, a rotation of zero switching state. This rotation provides a distribution of energy among the switches within a specific module in operation. There are two possible combinations of switching to provide a zero voltage at the output of intelligent battery module, as shown in Table 1. The rotation methodology alternates the switches used to provide a zero voltage with every second positive or negative operational level of the cell. In fact, as it will be shown in next section of this document, this rotation reduces twice the switching frequency of the switches in comparison with output voltage frequency of the intelligent battery module and the entire ACi battery pack. There are four rotation generator blocks 1001, 1002, 1003, and 1004 in the method provided herein for different levels of output voltage from 0 VDC to 3 VDC, which are presented in FIGS. 16A, 16B, 16C and 16D.

Each of four rotation generators in FIGS. 16A, 16B, 16C and 16D comprises: four digital comparators, one inverting element, four logic elements AND, two SR flip-flops Latch 1 and Latch 2 and two frequency dividers by 2. The structure and operational principle of all rotation generator blocks are the same; a difference is in the preset values of digital comparators only. In a 0 VDC rotation generator, when "di/dt" signal from di/dt estimator output is "true", the comparator Comp1 will set SR flip-flop Latch 1 output at 'true" when the "Level" signal is equal to "3", which corresponds to +1 VDC of output voltage level. Another comparator Comp2, at positive di/dt will reset Latch 2, when the "Level" signal is equal to "2", which corresponds to +0 VDC of output voltage level. In other words, a high level of pulse train at the output of Latch 1 will correspond to +1 VDC voltage at the output of the nine-level converter, while its zero level will indicate +0 VDC voltage level (+0 indicates that 0 VDC level is following after and/or before +VDC level). Finally, the circuit included the frequency divider block and logic element AND is intended to set the output signal Rot+0 VDC at "true" with a high level of Latch 1 output, which happens at +1 VDC output voltage level, and maintains this "true" signal until a second transition from +0 VDC to +1 VDC occurs. Such the output signal Rot+0 VDC is used to alternate two possible zero state switching combinations for the intelligent battery module in operation of providing +1 VDC voltage level. The same operational logic is behind the Rot−0 VDC signal, which is generated by the same 0 VDC rotation generator to alternate two zero state switching combinations for the intelligent battery module in operation of providing −1 VDC voltage level.

The intelligent battery module rotation controller 600 and SOC balancing block provided herein for a multi-level hysteresis controller are explained further. The detailed functional diagram of intelligent battery module rotation controller is presented in FIG. 12. The inputs of this block are the measured state of charges SOC1, SOC2, SOC3, and SOC4 from battery management systems (BMS) of all four intelligent battery modules in one phase. The output signals are the numbers of intelligent battery modules (from 1 to 4) with a maximum state of charge SOCmax, minimum state of charge SOCmin, and then SOCrot3 and SOCrot4, distributed as follows: SOCmin<SOCrot4<SOCrot3<SOCmax. In the beginning, SOC1 and SOC2 are compared with each other and if their difference $\Delta SOC_{12}$ is higher or lower than positive or negative threshold of hysteresis block Hyst 1, then the output of this block is set to "1" or "0" respectively, otherwise it maintains its previously set value at the output. This threshold helps ignore a noise of certain level in the feedback signal and regulates how often a rotation of intelligent battery modules should occur. Based on Hyst 1 output signal, Switch 1 chooses a number of intelligent battery module (1 or 2) with a higher SOC and Switch 5 passes its corresponding SOC value to Sum 3, which compares it with a lowest state of charge of SOC3 and SOC4, which go through the same comparison technique. Thus, at the output of the intelligent battery module rotation controller the intelligent battery modules numbers are distributed in accordance to their SOCs as SOCmin<SOCrot4 <SOCrot3<SOCmax. Before going to rotation blocks signals SOCmax and SOCmin are reassigned to SOCrot1 and SOCrot2 in SOC Balancing block (see FIG. 11) taking into account a sign of reference current $I_{REF}$. If the current $I_{REF}$ is positive, that corresponds to an energy transferring from intelligent battery modules to the motor, then the intelligent battery module with a maximum SOC participates in a rotation of all positive output voltage levels (but not at the same time). This will cause a faster discharge of this intelligent battery module with a maximum SOC, because at positive output voltage and positive load current there is only one way for energy to be transferred: from the intelligent battery module to the motor. At the same time, at positive output current (or $I_{REF}$) the intelligent battery module with a minimum SOC has to participate in providing the negative output voltage levels only, to charge up its battery's voltage as soon as possible. That is because at positive load current but negative output voltage of the output converter there is only one direction for energy transfer: from the motor to batteries.

The 0 VDC rotation and 1 VDC rotation blocks are presented in FIGS. 14A, 14B, 15A and 15B respectively. Let's describe +0 VDC rotation first. This block receives one control signal from intelligent battery module Balancing block SOCrot1, as well as one signal Rot+0 VDC from 0 VDC rotation generator, and provides the control signals for switching elements of nine-level ACi battery pack for +0 VDC output voltage, where +0 means that 0 VDC level is following after and/or before +VDC level. The multiplexer Switch 1 chooses one of four different combinations of switching signals, based on input signal SOCrot1, indicating which intelligent battery module is operating at the same time in providing +VDC output level. This means that a rotation of zero switching state has to be performed for this specific intelligent battery module (with SOCrot1 number). The input signal Rot+0 VDC controls a sequence of switching between two possible zero states [1 1] and [0 0] for the same intelligent battery module.

Block+1 VDC rotation has more complicated structure. Besides the control signal Rot+1 VDC coming from 1 VDC rotation generator block, It receives two control signals SOCrot1 and SOCrot3 from SOC balancing block. The first signal, SOC1rot, is used by multiplexer Switch 1 to set up a positive voltage at the output of intelligent battery module, which number is specified by this signal. This can be done by providing the switching combination [1 0] for that intelligent battery module. All other three intelligent battery modules have to provide a zero switching state. If at the output of converter, the voltage is changing between +0 VDC and +1 VDC, then the signal Rot+1 VDC is always "true" and there is no rotation of zero switching state for other three cells. If the output voltage is varying between +1 VDC and +2 VDC, then a rotation of zero state has to be performed for only one specific intelligent battery module which is involved in producing of +2 VDC level. The input signal Rot+1 VDC controls a sequence of switching between two possible zero states [1 1] and [0 0] for that intelligent battery module.

The same principle of operation is valid for −0 VDC rotation and −1 VDC rotation, with only a difference in input signals SOCrot2, instead of SOCrot1 and Rot−1 VDC, instead of Rot+1 VDC. The SOCrot3 signal, which indicates a number of cell operating at both +2DC and −2 VDC levels, remains the same as for positive rotation blocks.

Blocks+2 VDC rotation and +3 VDC rotation have a complex structure with four input signals, where three of them SOCrot1, SOCrot2 and SOCrot3 are coming from SOC balancing block and one signal is either from 2 VDC rotation generator or 3 VDC rotation generator is intended to control a sequence of changing between zero switching states for the specific intelligent battery module.

A detailed discussion regarding multi-level hysteresis control is provided in U.S. Provisional Application No. 62/518,331, filed Jun. 12, 2017, and U.S. Provisional Application No. 62/521,227, filed Jun. 16, 2017, which applications are incorporated by reference as if set forth in full.

Local and Master ECUs Functions

Figure 17:
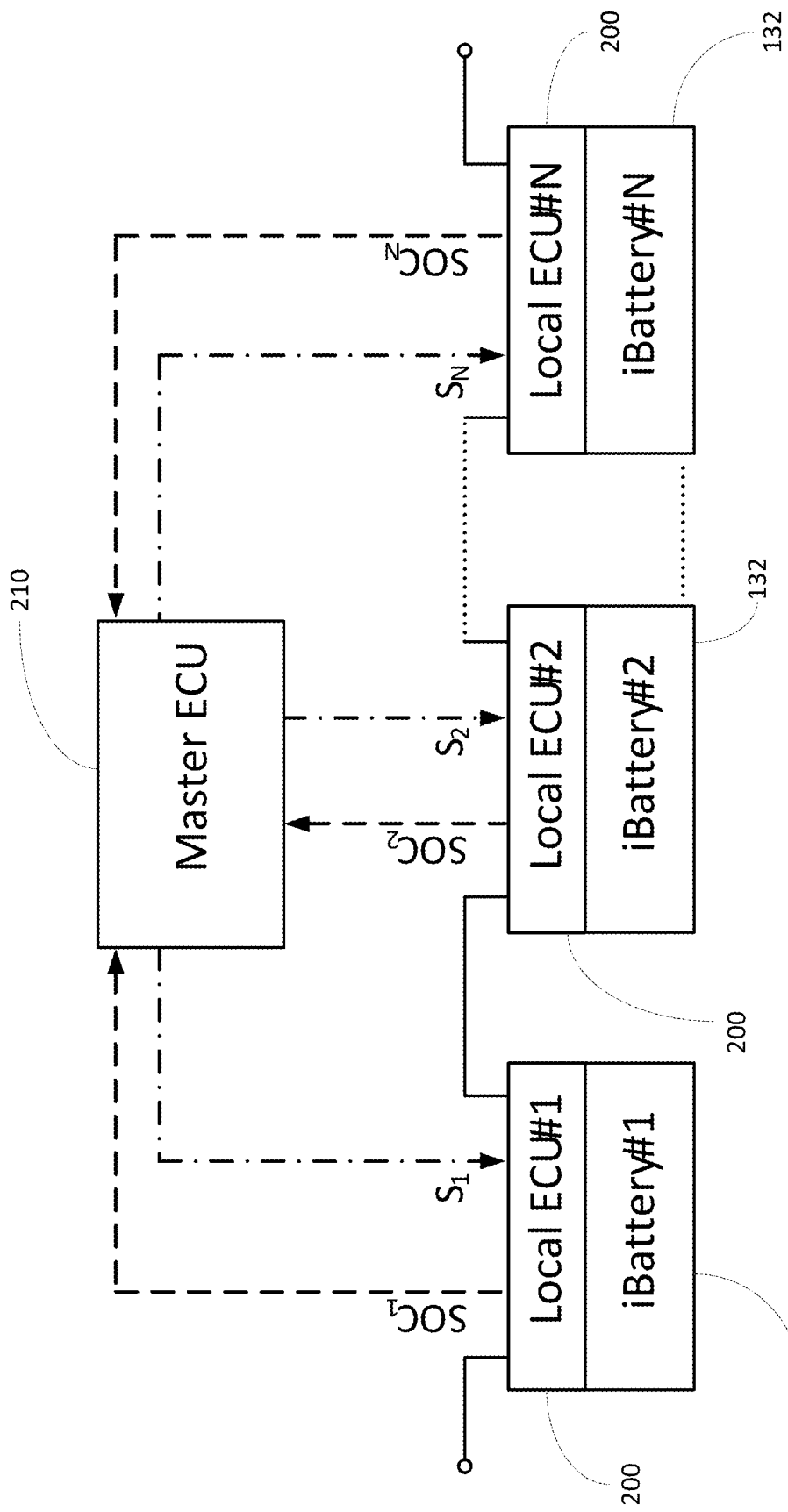
FIG. 17 illustrates a schematic diagram of a centralized connection of all intelligent modules to a master ECU for state of charge (SOC) balancing.

The power electronics converters and local ECU 200, which manages the intelligent battery module 132 operation (see FIG. 5), works through utilizing a state of charge (SOC) estimator to measure the initial SOC of the battery. A master control system (ECU) 210 receives this initial SOC data of all intelligent battery modules, as depicted in FIG. 17 (see also FIG. 5), and classifies them.

A SOC balancing technique for multi-level hysteresis controller was described above. For multi-level PWM, this balancing methodology is as follows: assuming all batteries are balanced before discharge, the strongest battery is the one with the highest initial SOC and the weakest battery is the one with the lowest initial SOC when the ACi battery pack is fully charged.

Depending on this data, the master ECU 210 computes the corresponding switching signals array that is necessary for proper operation of each individual intelligent battery module based on its battery capacity. In other words, in order to balance the state of charge of the modules, the SOC of each module should be compared to the total SOC, which can be calculated as:

$$SOC_{tot} = \frac{\sum_{i=1}^{n} SOC_i Q_i}{\sum_{i=1}^{n} Q_i}$$

Where $SOC_i$ and $Q_i$—individual SOC and capacity of i-th intelligent battery module's battery and the difference along with a PI controller may be used to control the modulation index (M) of each module. Note that when the modules are charging the direction of the effect of SOC difference must be reversed since in this case the module with higher SOC is expected to receive less energy compared to the other modules.

The local control system of the intelligent battery module 132 gets this information and thus, there exists different switching signals arrays $S_{1 \ldots N}$ for each intelligent battery module which determines the individual DC currents ($I_{DC1}$, $I_{DC2} \ldots I_{DCN}$) and DC-bus voltages (battery voltages $V_{B1}$, $V_{B2} \ldots V_{BN}$) of the system. In this way, the power management operates, and built-in power electronics unit manages the output power of each intelligent battery module autonomously. The strongest battery carries the highest current and the weakest battery carries the least current so that the SOC of all the batteries converge at a particular time.

Supercapacitor Module

The supercapacitor module 38 of intelligent battery module 132 (FIG. 5) is connected in parallel to the main battery 32 and to the output converter 52. During acceleration, the capacitor voltage is allowed to discharge from full charge (50 Vdc) to approximately one-third of its nominal voltage (17 Vdc), allowing it to deliver 11 kW of useful energy. This amount of energy allows taking 2.2 kW of power during 5 seconds form one intelligent battery module and 66 kW in total if 30 intelligent battery modules are placed in an ACi battery pack, which is enough power and time for a good acceleration without detriment to the battery life. During deceleration (regenerative braking), energy is recovered in a similar way, charging back the supercapacitors.

When the vehicle accelerates, the battery delivers the amount of current the motor needs. If this current exceeds a current limit for the battery, then the supercapacitor provides the difference. The regenerative braking operation is similar. In this case, the motor works as a generator delivering the recovered energy into the battery, but if the current injected exceeds the limit, then the DC-DC converter injects the excess into the supercapacitor.

The DC-DC converter works in two ways: Boost operation, used for acceleration which discharges the supercapacitor; and Buck operation used for deceleration (regenerative braking), which charges the supercapacitor. During Boost operation (acceleration), the MOSFET $S_2$ is switched on and off at a controlled duty cycle D, to transfer the required amount of energy from the capacitor to the battery pack. When $S_2$ is ON, energy is taken from the supercapacitor and stored in the inductor $L_C$. When $S_2$ is switched OFF, the energy stored in $L_C$ is transferred into $C_F$, through $S_1$, and then into the motor and/or battery. During Buck operation, the converter introduces energy from the battery to the supercapacitor. That operation is accomplished with a controlled operation on $S_1$. When $S_1$ is switched ON, the energy goes from the battery to the supercapacitor, and $L_C$ stores part of this energy. When $S_1$ is switched OFF, the remaining energy stored in $L_C$ is transferred inside the supercapacitor through diode of $S_2$.

The battery as a primary energy source is the one with the highest energy content and should therefore supply the average power needed by the motor. The supercapacitor is a secondary energy source and assists the battery by providing/absorbing the momentary load power peaks.

Figure 18:
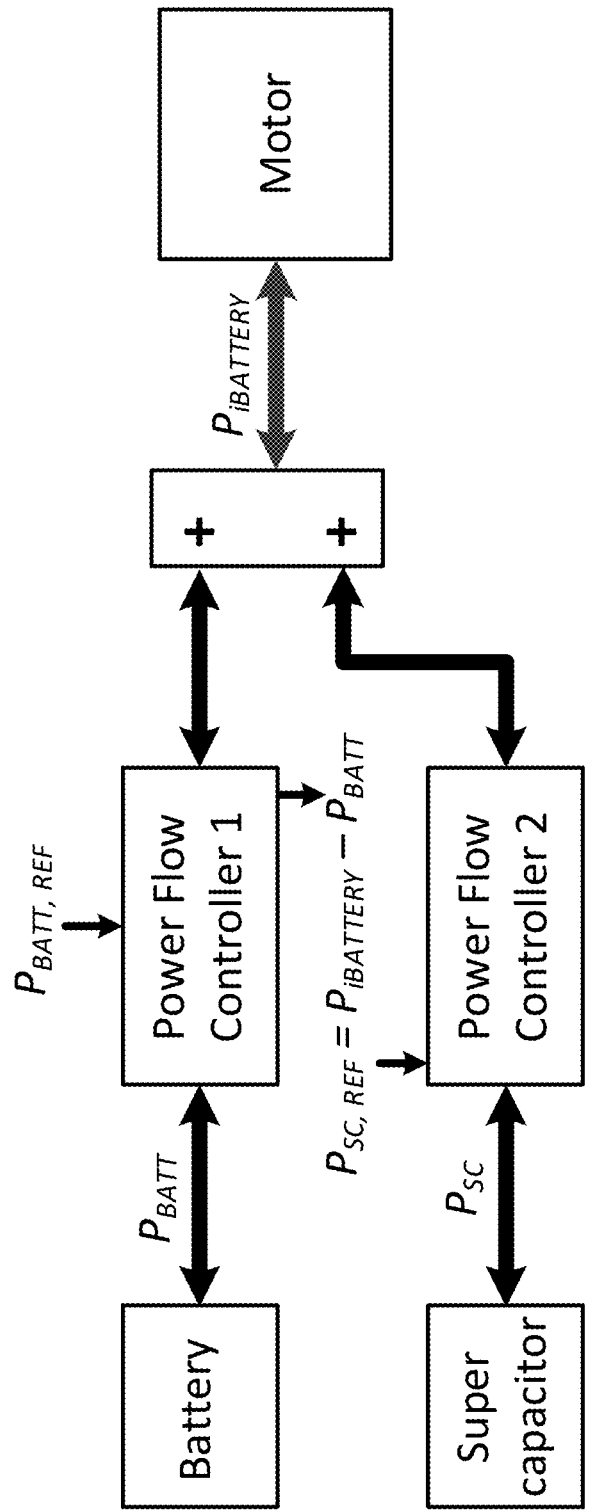
FIG. 18 illustrates a flow diagram of structure power flow management in the intelligent battery module.

The redundant structure of power flow management between two sources and motor is presented in FIG. 18. It has the advantage among other power control methods since allows a complete decoupling between the electrical characteristics (terminal voltage and current) of each source and those of the load. The power flow controller 1 receives a signal of reference battery power flow $P_{BATT, REF}$ from local ECU of intelligent battery module. This signal is determined by main power management controller located in a master ECU based on motor power $P_{iBATTERY}$ requirements and SOC of individual intelligent battery module's battery. The power flow controller 1 estimates a maximum allowable battery charge/discharge current and calculate a real permissible battery power flow $P_{BATT}$. This signal is compared with $P_{iBATTERY}$ and their difference is applied to the power flow controller 2 as a signal $P_{SC, REF}$. This controller calculates Ism current based on supercapacitor voltage $V_{SC}$ and determines the switching signals $S_1$ and $S_2$ for buck/boost converter of Supercapacitor Module, which basic principles of operation are described above. Thus, $P_{iBATTERY}$ flow is provided by the output converter, $P_{BATT}$ is estimated based on a maximum battery current and actual SOC and is ensured as a difference between $P_{iBATTERY}$ and $P_{SC}$, where the last one is managed by supercapacitor module's converter.

Another important function performed by supercapacitor module is an active filtering of the second-order current harmonic that appears in the output converter's DC-current $I_{DC}$ as result of the intrinsic pulsating power nature of a single-phase system. Considering $V(t)_{OUT}$ and $I(t)_{OUT}$ as the output voltage and current of intelligent battery module:

$$V(t)_{OUT} = Vm_{OUT} \cos(\omega t)$$

$$I(t)_{OUT} = Im_{OUT} \cos(\omega t \varphi);$$

The instantaneous input-output power balance of the intelligent battery module gives:

$$P(t)_{OUT} = V(t)_{OUT} I(t)_{OUT} = \tfrac{1}{2} Vm_{OUT} Im_{OUT} \cos(\varphi) + \tfrac{1}{2} Vm_{OUT} Im_{OUT} \cos(2\omega + \varphi)$$

The first constant term refers to the average power that is used to charge/discharge the battery. The second oscillating term, however, does not contribute to the average battery SOC. This component has a considerable peak-to-peak value, which can reach up to two times the grid current amplitude at a modulation index of unity. The second-order current component exhibits some disadvantages, e.g., increase of the inner battery resistive losses related to the resulting current RMS value as well as periodic change of the battery behavior.

Figure 19:
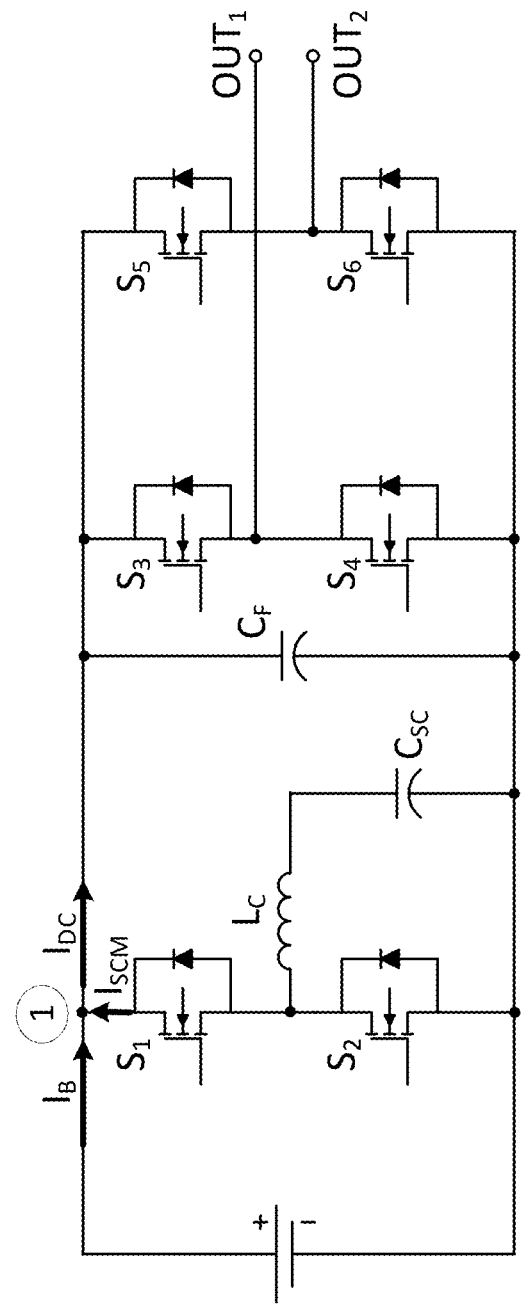
FIG. 19 illustrates a circuit diagram showing the topology of the intelligent battery module and currents in node 1.
Figure 20A:
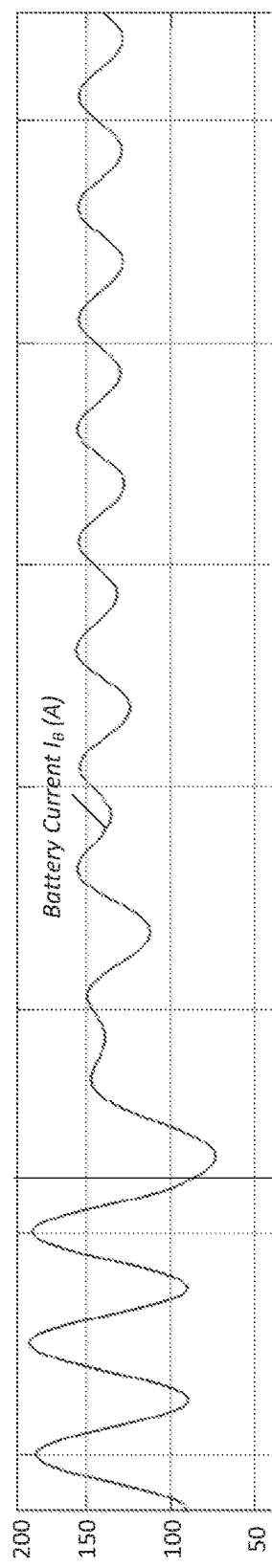
FIGS. 20A and 20B illustrate graphs of currents in the intelligent battery module, when the supercapacitor module operates as an active filter.
Figure 20B:
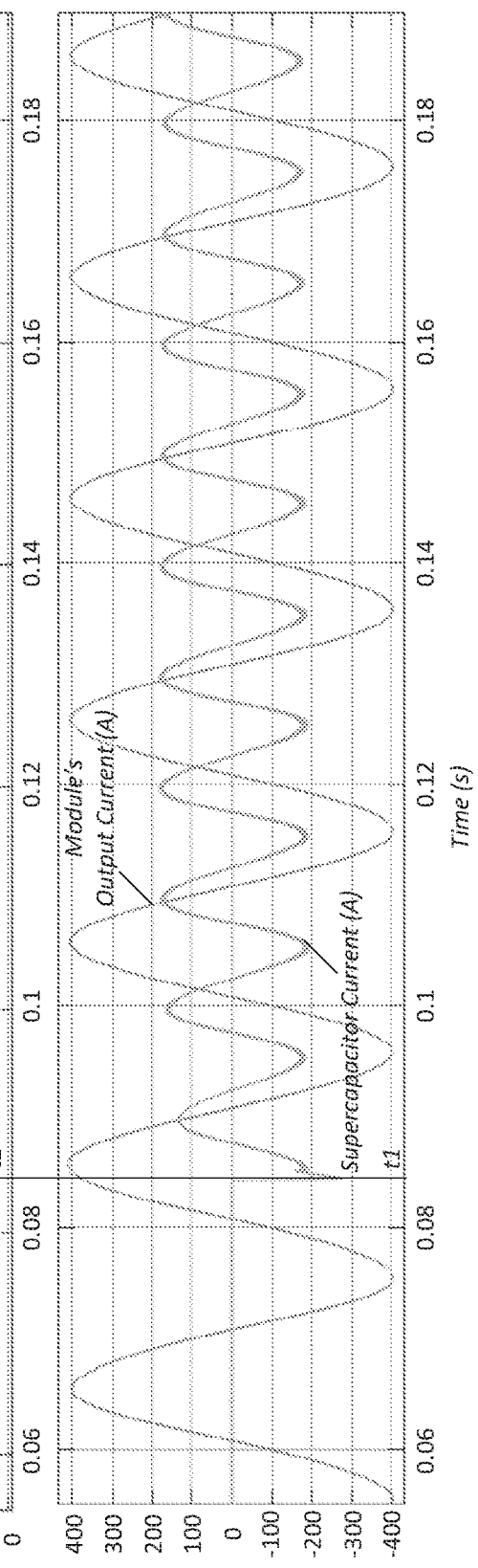

The main waveforms for the active filtering case are shown in FIGS. 20A and 20B. The supercapacitor acts as an active filter aiming at the elimination of the second-order harmonic in battery current $I_B$. Before the compensations starts (before time moment t1), the current of Battery $I_B$ includes DC-component ($I_B$=130A) and second order component with an amplitude $I_{2AC}$=60A. Starting from the time moment t1, the supercapacitor module starts generating supercapacitor current $I_{SC}$, redirecting the second order harmonic of current $I_B$ to the supercapacitor (see FIG. 20B). This current $I_{SC}$ has amplitude of main harmonic equal to that of second order harmonic of $I_{DC}$ current (see FIG. 19), but with nearly opposite phase angle, in such a way that the resulting current in battery $I_B$ includes either DC-component only or mostly DC-component with some significantly reduced AC-ripples, as shown in FIG. 20A.

At high RPMs a second-order current harmonic is suppressed significantly by filtering capacitor $C_F$ and operation of supercapacitor module is not required.

Figure 21:
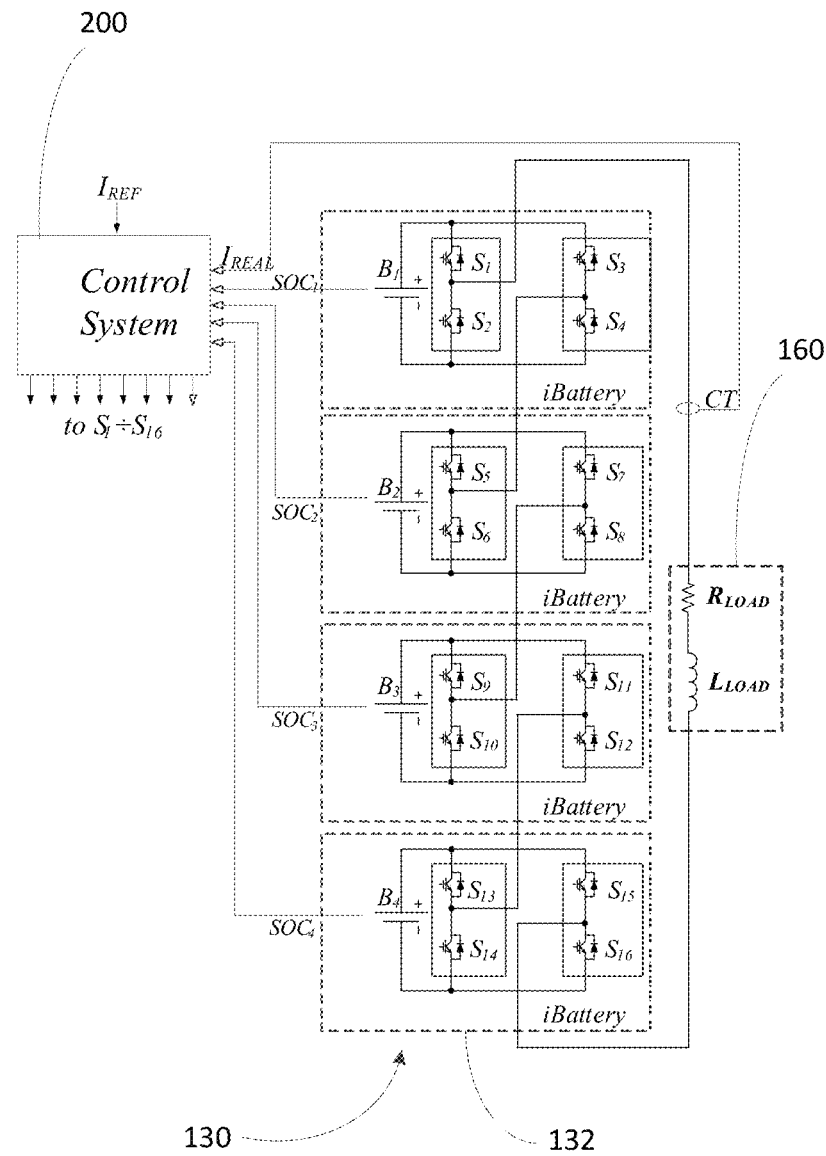
FIG. 21 illustrates a single-phase intelligent battery pack connected to a single-phase load.

FIG. 21 shows the single-phase nine-level four-quadrant intelligent battery pack connected to a single-phase load, which is presented as RL-load. This system can be used for residential or commercial buildings energy storage and interruptible power supply systems.

Figure 22:
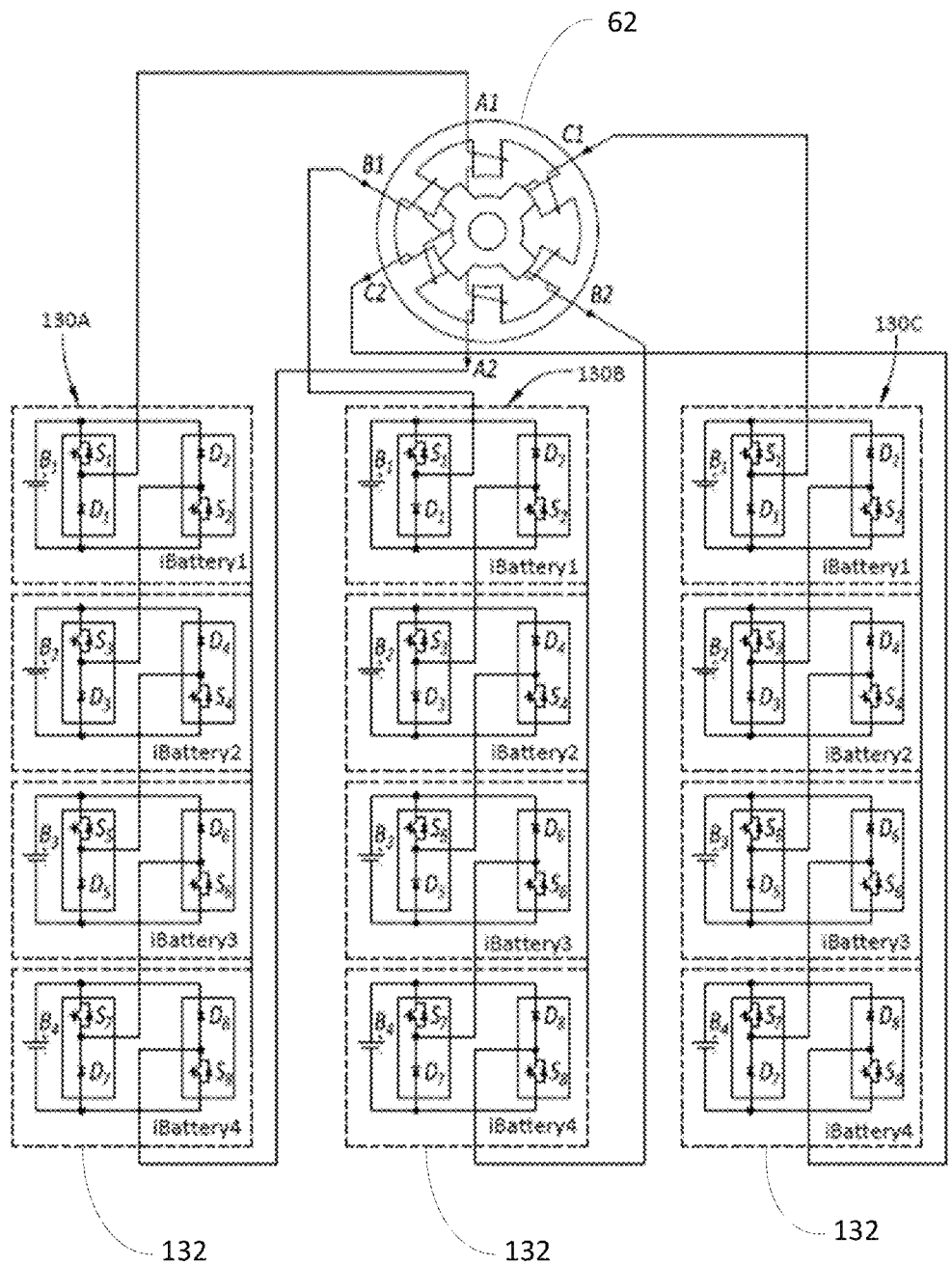
FIG. 22 illustrates a three-phase intelligent battery pack connected to Switched Reluctance Motor.

FIG. 22 shows the three-phase intelligent battery pack comprising three nine-level two quadrant single-phase intellectual battery packs connected to three-phase Switched-Reluctance Motor (SRM). A usage of multi-level hysteresis current controller and intelligent battery pack allows improving efficiency and overall performance of SRM, as well as significant reduction of torque ripples and acoustic noise.

In the foregoing description, numerous specific details are given to provide a thorough understanding of the present embodiments. However, it will be apparent that the present embodiments may be practiced without these specific details. In order to increase clarity, some well-known circuits, system configurations, and process steps may not be described in detail. In other instances, structures and devices are shown in a block diagram form in order to avoid obscuring the invention.

The drawings showing embodiments of the present disclosure are semi-diagrammatic and not to scale and, particularly, some of the dimensions are for the clarity of presentation and are shown exaggerated in the drawing Figures.

Reference in the foregoing description to "one embodiment" or "an embodiment" or "certain embodiments" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the methods used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared or otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following disclosure, it is appreciated that throughout the disclosure terms such as "processing," "computing," "calculating," "determining," "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The present embodiments also relate to an apparatus for performing the operations herein. This apparatus may be specially constructed for the required purposes, or it may be a general-purpose computer selectively activated or reconfigured by a computer program stored in the computer. The present embodiments may take the form of an entirely hardware embodiment, an entirely software embodiment or an embodiment including both hardware and software elements. In one embodiment, the present embodiments are implemented in software comprising instructions or data stored on a computer-readable storage medium, which includes but is not limited to firmware, resident software, microcode or another method for storing instructions for execution by a processor.

Furthermore, the present embodiments may take the form of a computer program product accessible from a computer-usable or computer-readable storage medium providing program code for use by, or in connection with, a computer or any instruction execution system. For the purposes of this description, a computer-usable or computer readable storage medium is any apparatus that can contain, store or transport the program for use by or in connection with the instruction execution system, apparatus or device. The computer-readable storage medium can be an electronic, magnetic, optical, electromagnetic, infrared, or semiconductor system (or apparatus or device) or a propagation medium. Examples of a tangible computer-readable storage medium include, but are not limited to, a semiconductor or solid state memory, magnetic tape, a removable computer diskette, a random access memory (RAM), a read-only memory (ROM), a rigid magnetic disk, an optical disk, an EPROM, an EEPROM, a magnetic card or an optical card, or any type of computer-readable storage medium suitable for storing electronic instructions, and each coupled to a computer system bus. Examples of optical disks include compact disk-read only memory (CD-ROM), compact disk-read/write (CD-R/W) and digital video disc (DVD).

To the extent the embodiments disclosed herein include or operate in association with memory, storage, and/or computer readable media, then that memory, storage, and/or computer readable media are non-transitory. Accordingly, to the extent that memory, storage, and/or computer readable media are covered by one or more claims, then that memory, storage, and/or computer readable media is only non-transitory. The terms "non-transitory" and "tangible" as used herein, are intended to describe memory, storage, and/or computer readable media excluding propagating electromagnetic signals, but are not intended to limit the type of memory, storage, and/or computer readable media in terms of the persistency of storage or otherwise. For example, "non-transitory" and/or "tangible" memory, storage, and/or computer readable media encompasses volatile and non-volatile media such as random access media (e.g., RAM, SRAM, DRAM, FRAM, etc.), read-only media (e.g., ROM, PROM, EPROM, EEPROM, flash, etc.) and combinations thereof (e.g., hybrid RAM and ROM, NVRAM, etc.) and later-developed variants thereof.

A data processing system suitable for storing and/or executing program code includes at least one processor coupled directly or indirectly to memory elements through a system bus. The memory elements may include local memory employed during actual execution of the program code, bulk storage and cache memories providing temporary storage of at least some program code in order to reduce the number of times code must be retrieved from bulk storage during execution. In some embodiments, input/output (I/O) devices (such as keyboards, displays, pointing devices or other devices configured to receive data or to present data) are coupled to the system either directly or through intervening I/O controllers.

Network adapters may also be coupled to the data processing system to allow coupling to other data processing systems or remote printers or storage devices through intervening private or public networks. Modems, cable modem and Ethernet cards are just examples of the currently available types of network adapters.

Finally, the methods and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. It will be appreciated that a variety of programming languages may be used to implement the teachings of the invention as described herein.

The figures and the detailed description describe certain embodiments by way of illustration only. One skilled in the art will readily recognize from the foregoing description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

Embodiments of the present disclosure are directed to a converter-battery module architecture for an intelligent battery (iBattery) module used as a building unit of an intelligent battery pack or system of intelligent battery packs. In embodiments, the iBattery module comprises a battery unit, a supercapacitor or ultra-capacitor module unit and an output converter unit. In embodiments, a local control unit of the iBattery module is configured to accept, process, and transmit signals, including, but not limited to, from temperature, voltage and current sensors, and the like, of the iBattery module; triggering and faults signals to and from semiconductor switches; voltages of elementary cells of the battery units and the supercapacitor modules. In embodiments, the local control system performs a communication with and transmission of corresponding control signals to and from a master control unit of an intelligent alternating-current battery pack (ACi-Battery Pack) comprising a plurality of iBattery modules.

Embodiments of the present disclosure are directed to an intelligent alternating-current battery pack (ACi-Battery Pack) comprising two or more iBattery modules interconnected together in each phase. In embodiments, the output voltage of any shape and frequency can be generated at the outputs of ACi-Battery Pack as a superposition of output voltages of individual iBattery modules.

Embodiments of the present disclosure are directed to a method of multi-level current hysteresis control to control the ACi-Battery Pack to provide SOC and balancing between iBatteries in ACi-Battery Pack. In embodiments, the method enables power sharing among all iBattery modules in ACi-Battery Pack. In embodiments, the power sharing among all iBattery modules can be used to keep the SOCs of the battery modules of iBatteries balanced at all times during operation, which ensures that the full capacity of each module is utilized regardless of possible differences in the capacities.

Embodiments of the present disclosure are directed to processes, methodologies and systems described herein relate to a motor vehicle and a stationary energy storage system.

Embodiments of the present disclosure are directed to an electric vehicle having a chassis, three or more wheels operably coupled to the chassis, one or more electric motors operably coupled to the three or more wheels, one or more intelligent modular battery packs operably coupled to the one or more motors, and a control system operably coupled to the one or more battery packs and the one or more motors.

In embodiments, the chassis is drivetrain-less. In embodiments, the one or more motors are in-wheel motors.

In embodiments, the one or more intelligent modular battery packs having a cascaded interconnected architecture.

In embodiments, the battery packs comprise a plurality of interconnected intelligent battery modules.

In embodiments, the battery modules comprise an integrated combination of a networked low voltage converter/controller with peer-to-peer communication capability, embedded ultra-capacitor or super-capacitor, a battery management system, and serially connected set of individual cells.

In embodiments, the battery packs comprise a neural network comprising a plurality of interconnected intelligent battery modules.

In embodiments, the battery modules comprise an integrated combination of a battery with a BMS, a supercapacitor module, and an output converter.

In embodiments, the supercapacitor module includes a bidirectional DC-DC converter and a supercapacitor bank.

In embodiments, the output converter comprises a four-quadrant H-bridge.

In embodiments, the control system comprises a bi-directional multilevel controller.

In embodiments, the bi-directional multilevel controller is a bi-directional multilevel hysteresis controller.

In embodiments, the bi-directional multilevel controller is combined with temperature sensors and networking interface logic.

In embodiments, the control system is configured to balance battery utilization through individual switching of modules based on module age, thermal condition and performance characteristics.

In embodiments, the battery packs are switchable to a rectifier/charger operation.

Embodiments of the present disclosure are directed to an intelligent modular battery pack comprising a cascaded architecture comprising a plurality of inter-connected intelligent battery modules.

In embodiments, the battery modules comprise an integrated combination of a networked low voltage converter/controller with peer-to-peer communication capability, embedded ultra-capacitor, battery management system and serially connected set of individual cells.

In embodiments, the inter-connected intelligent battery modules comprise a neural network.

In embodiments, the battery modules comprise an integrated combination of a battery with a BMS, a supercapacitor module, and an output converter.

In embodiments, the supercapacitor module includes a bidirectional DC-DC converter and a supercapacitor bank.

In embodiments, the output converter comprises a four-quadrant H-bridge.

Embodiments of the present disclosure are directed to an intelligent battery module comprising an integrated low voltage converter/controller with peer-to-peer communication capability, an embedded ultra-capacitor, a battery management system, and a plurality of serially connected set of individual cells.

Embodiments of the present disclosure are directed to an intelligent battery module comprising a battery with an integrated BMS, a supercapacitor module operably coupled to the battery, and an output converter operably coupled to the battery and the supercapacitor module.

In embodiments, the supercapacitor module includes a bidirectional DC-DC converter and a supercapacitor bank.

In embodiments, the output converter comprises a four-quadrant H-bridge.

All features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. Express recitation of every possible combination and substitution is overly burdensome, especially given that the permissibility of each and every such combination and substitution will be readily recognized by those of ordinary skill in the art upon reading this description.

In many instances, entities are described herein as being coupled to other entities. It should be understood that the terms "coupled" and "connected" or any of their forms are used interchangeably herein and, in both cases, are generic to the direct coupling of two entities without any non-negligible e.g., parasitic intervening entities and the indirect coupling of two entities with one or more non-negligible intervening entities. Where entities are shown as being directly coupled together, or described as coupled together without description of any intervening entity, it should be understood that those entities can be indirectly coupled together as well unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

What is claimed is:

1. A modular battery pack system controllable to supply power to a motor load of an electric vehicle (EV), the modular battery pack system comprising:
a plurality of converter modules arranged in at least three cascades, each cascade comprising at least two converter modules coupled together to output a single phase AC voltage signal comprising a superposition of pulse width modulated (PWM) output voltages from each of the at least two converter modules, wherein the at least three cascades together output AC voltage signals of at least three different phases, and wherein each of the plurality of converter modules comprises:
a primary energy source coupled between a first node and a common node, wherein the primary energy source is a battery and wherein a voltage between the first and common nodes is $V_{DC}$;
a secondary energy source coupled between an inductor and the common node;
switch circuitry comprising a first plurality of switches controllable to selectively couple the secondary energy source through the inductor to either the first node or the common node, and a second plurality of switches controllable to selectively output one of three voltages from the module, wherein the three voltages are $+V_{DC}$, zero, and $V_{DC}$;
a capacitor coupled between the first node and the common node and adapted to receive and store energy from the inductor; and
a local control device configured to output switch signals to the first and second plurality of switches and configured to output state of charge (SOC) information about the battery; and
a master control device configured to use SOC information received from each local control device to generate and output control information to each of the local control devices to balance utilization of each battery across the plurality of converter modules.

2. The modular battery pack system of claim 1, wherein each battery comprises a serial connection of battery cells.

3. The modular battery pack system of claim 1, wherein each secondary energy source is a supercapacitor or an ultracapacitor.

4. The modular battery pack system of claim 1, wherein each switch of the first plurality of switches is a transistor with a parallel diode.

5. The modular battery pack system of claim 1, wherein, for each converter module of the plurality of converter modules, the switch circuitry is controllable to supply power from the secondary energy source to supplement power provided by the battery during acceleration of the EV.

6. The modular battery pack system of claim 1, wherein, for each converter module of the plurality of converter modules, the switch circuitry is controllable to charge the battery during regenerative braking of the EV.

7. The modular battery pack system of claim 1, wherein, for each converter module of the plurality of converter modules, the switch circuitry is controllable to charge the secondary energy source during regenerative braking of the EV.

8. The modular battery pack system of claim 1, wherein, for each converter module of the plurality of converter modules, the switch circuitry is controllable to inject excess current to charge the secondary energy source when a charge current produced during regenerative braking of the EV exceeds a battery limit.

9. The modular battery pack system of claim 1, wherein, for each converter module of the plurality of converter modules, the switch circuitry is controllable to decouple both the battery and secondary energy source from the motor load of the EV.

10. The modular battery pack system of claim 1, wherein, for each converter module of the plurality of converter modules, the switch circuitry is controllable to use current from the secondary energy source to actively filter a second order harmonic in current from the battery.

11. The modular battery pack system of claim 1, wherein the master control device is configured to generate and output control information comprising switch signals to each of the local control devices.

12. The modular battery pack system of claim 1, wherein, for each converter module of the plurality of converter modules, the local control device is configured to generate and output switch signals for the first plurality of switches.

13. The modular battery pack system of claim 1, wherein each converter module of the plurality of converter modules comprises temperature, voltage and current sensors, and the local control device is configured to process signals from the temperature, voltage and current sensors of the converter module.

14. The modular battery pack system of claim 1, wherein each cascade comprises S converter modules, wherein S is two or more, the system configured to:
generate, for each cascade, at least one reference signal and at least S carrier signals, wherein each of the at least S carrier signals has a different phase;
generate, for each cascade, at least 2S pulse width modulated (PWM) switching signals by use of the at least one reference signal and the at least S carrier signals; and
control the second plurality of switches of the S converter modules of each cascade with the PWM switching signals such that each cascade outputs the single phase AC voltage signal comprising the superposition of output voltages from each of the S converter modules of the cascade.

15. A modular battery pack system controllable to supply power to a motor load of an electric vehicle (EV), the modular battery pack system comprising:
a plurality of converter modules arranged in at least three cascades, each cascade comprising at least two converter modules coupled together to output a single phase AC voltage signal comprising a superposition of pulse width modulated (PWM) output voltages from each of the at least two converter modules, wherein the at least three cascades together output AC voltage signals of at least three different phases, and wherein each of the plurality of converter modules comprises:

a primary energy source coupled between a first node and a common node, wherein the primary energy source is a battery;

a secondary energy source coupled between an inductor and the common node;

switch circuitry comprising a first plurality of switches controllable to selectively couple the secondary energy source through the inductor to either the first node or the common node, and a second plurality of switches controllable to selectively output three voltages from the module, wherein the switch circuitry is controllable to supply power from the secondary energy source to supplement power provided by the battery during acceleration of the EV and to charge the battery and the secondary energy source during regenerative braking of the EV;

a capacitor coupled between the first node and the common node and adapted to receive and store energy from the inductor; and a local control device configured to output switch signals to the first and second plurality of switches and configured to output a sensed operating parameter about the converter module; and a master control device configured to use the sensed operating parameter received from each local control device to generate and output control information to each of the local control devices to balance utilization of each battery across the plurality of converter modules.

16. The modular battery pack system of claim 15, wherein the sensed operating parameter is a state of charge (SOC) of the battery, a voltage of the battery, a current of the battery, or a temperature.

17. The modular battery pack system of claim 15, wherein each battery comprises a serial connection of battery cells.

18. The modular battery pack system of claim 15, wherein each secondary energy source is a supercapacitor or an ultracapacitor.

19. The modular battery pack system of claim 15, wherein each switch of the first plurality of switches is a transistor with a parallel diode.

20. The modular battery pack system of claim 15, wherein, for each converter module of the plurality of converter modules, the switch circuitry is controllable to inject excess current to charge the secondary energy source when a charge current produced during regenerative braking of the EV exceeds a battery limit.

21. The modular battery pack system of claim 15, wherein, for each converter module of the plurality of converter modules, the switch circuitry is controllable to decouple both the battery and secondary energy source from the motor load of the EV.

22. The modular battery pack system of claim 15, wherein, for each converter module of the plurality of converter modules, the switch circuitry is controllable to use current from the secondary energy source to actively filter a second order harmonic in current from the battery.

23. The modular battery pack system of claim 15, wherein the master control device is configured to generate and output control information comprising switch signals to each of the local control devices.

24. The modular battery pack system of claim 15, wherein, for each converter module of the plurality of converter modules, the local control device is configured to generate and output switch signals for the first plurality of switches.

25. The modular battery pack system of claim 15, wherein each converter module of the plurality of converter modules comprises temperature, voltage and current sensors, and the local control device is configured to process signals from the temperature, voltage and current sensors of the converter module.

26. The modular battery pack system of claim 15, wherein each cascade comprises S converter modules, wherein S is two or more, the system configured to:

generate, for each cascade, at least one reference signal and at least S carrier signals, wherein each of the at least S carrier signals has a different phase;

generate, for each cascade, at least 2S pulse width modulated (PWM) switching signals by use of the at least one reference signal and the at least S carrier signals; and control the second plurality of switches of the S converter modules of each cascade with the PWM switching signals such that each cascade outputs the single phase AC voltage signal comprising the superposition of output voltages from each of the S converter modules of the cascade.

27. A method of generating power for a load using a modular battery pack system that comprises a plurality of converter modules arranged in at least three cascades, each cascade comprising S converter modules coupled in series wherein S is two or more, wherein the at least three cascades together output AC voltage signals of at least three different phases, and wherein each converter module comprises a battery and a plurality of switches controllable to selectively output voltages from the module, the method comprising:

sensing operating parameters about the batteries of the plurality of converter modules;

generating, for each cascade, at least one reference signal;

generating, for each cascade, at least S carrier signals wherein each of the at least S carrier signals has a different phase;

generating, for each cascade, at least 2S pulse width modulated (PWM) switching signals using the at least one reference signal and the at least S carrier signals; and controlling the plurality of switches of the S converter modules of each cascade with the PWM switching signals such that each cascade outputs a single phase AC voltage signal comprising a superposition of output voltages from each of the S converter modules of the cascade, wherein control of the plurality of switches of the S converter modules of each cascade with the generated PWM switching signals is for utilization balancing of each battery across the plurality of converter modules.

28. The method of claim 27, wherein controlling the plurality of switches of the S converter modules of each cascade with the PWM switching signals comprises:

controlling the plurality of switches of a first converter module of a first cascade to selectively output one of three output voltages, wherein the three output voltages are +V, 0, and −V.

29. The method of claim 27, wherein the at least S carrier signals each have a different phase separated by 360°/2S.

30. The method of claim 27, wherein a first reference signal Vref and a second reference signal −Vref are generated for each cascade, and wherein the at least S carrier signals are triangular carrier signals.

31. The method of claim 27, wherein the operating parameters comprise states of charge (SOC) of the batteries, and wherein control of the plurality of switches of the S converter modules of each cascade with the generated PWM switching signals is for SOC balancing of each battery across the plurality of converter modules.

32. The method of claim 31, further comprising comparing a state of charge (SOC) for a battery to a total state of charge (SOC) for SOC balancing.

33. The method of claim 27, wherein the operating parameters comprise states of charge (SOC) and temperatures of the batteries, and wherein control of the plurality of switches of the S converter modules of each cascade with the generated PWM switching signals is for SOC balancing and thermal management of each battery across the plurality of converter modules.

34. The method of claim 27, wherein generation of the PWM switching signals and control of the plurality of switches of the S converter modules of each cascade with the generated PWM switching signals balances state of charge (SOC) and temperature of each battery across the plurality of converter modules.

35. The method of claim 27, further comprising controlling a modulation index of each of the S converter modules of each cascade.

36. The method of claim 35, wherein control of the modulation index for a converter module is based on a state of charge (SOC) and capacity of the battery of the converter module.

37. The method of claim 27, wherein the battery of each of the plurality of converter modules is a primary energy source, and wherein each of the plurality of converter modules comprises a secondary energy source.

38. The method of claim 37, further comprising actively filtering a second order harmonic in a battery output of each converter module with the secondary energy source.

39. The method of claim 27, wherein the load is a motor of a vehicle, the battery of each of the plurality of converter modules is a primary energy source, and each of the plurality of converter modules comprises a secondary energy source.

40. The method of claim 39, further comprising supplying power from each secondary energy source to supplement power supplied by each battery during acceleration of the vehicle.

41. The method of claim 39, further comprising charging each battery and secondary energy source with regenerative braking current.

42. The method of claim 39, further comprising, when a charge current produced during regenerative braking exceeds a battery limit, injecting at least an excess charge current to the secondary energy source.

43. The method of claim 39, wherein each secondary energy source is a supercapacitor or an ultracapacitor.

44. The method of claim 27, wherein the load is an in-wheel motor of a vehicle.

\* \* \* \* \*